US012150902B2

(12) United States Patent
Lim et al.

(10) Patent No.: US 12,150,902 B2
(45) Date of Patent: Nov. 26, 2024

(54) SURGICAL TABLE

(71) Applicant: Warsaw Orthopedic, Inc., Warsaw, IN (US)

(72) Inventors: Roy K. Lim, Memphis, TN (US); Mark C. Dace, Memphis, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 399 days.

(21) Appl. No.: 17/741,125

(22) Filed: May 10, 2022

(65) Prior Publication Data

US 2023/0363969 A1 Nov. 16, 2023

(51) Int. Cl.

| | |
|---|---|
| ***A61G 13/08*** | (2006.01) |
| ***A61G 13/02*** | (2006.01) |
| ***A61G 13/04*** | (2006.01) |
| ***A61G 13/06*** | (2006.01) |
| ***A61G 13/12*** | (2006.01) |

(52) U.S. Cl.

CPC ............. *A61G 13/08* (2013.01); *A61G 13/02* (2013.01); *A61G 13/04* (2013.01); *A61G 13/06* (2013.01); *A61G 13/121* (2013.01); *A61G 13/122* (2013.01)

(58) Field of Classification Search

None

See application file for complete search history.

(56) References Cited

U.S. PATENT DOCUMENTS 2,691,979 A 10/1954 Watson
3,060,925 A 10/1962 Honsaker et al.
3,227,440 A 1/1966 Scott
3,293,667 A 12/1966 Ohrberg
3,306,287 A 2/1967 Arp
3,389,702 A 6/1968 Kennedy (Continued)

FOREIGN PATENT DOCUMENTS

EP 3158986 4/2017
EP 3434248 1/2019

(Continued)

OTHER PUBLICATIONS

International Search Report and Written Opinion dated Jul. 19, 2023 in PCT/IB2023/054288.

(Continued)

*Primary Examiner* — Adam C Ortiz

(57) ABSTRACT

A surgical table including a first platform portion and a second platform portion that are independently moveable relative to one another is provided. A first portion of a patient can be supported by the first platform portion and a second portion of the patient can be supported by the second platform portion, and the first platform portion and the second platform portion can be adjusted relative to one another to correspondingly adjust positions/orientations of the first portion and the second portion of the patient. To illustrate, using a first end portion supporting the first platform portion, the first platform portion can be rotated about a vertical axis and moved side to side to adjust the position/orientation thereof relative to the second platform portion, and using a second end portion supporting the second platform portion, the second platform portion can be moved toward and away from first platform portion.

20 Claims, 14 Drawing Sheets

(56) References Cited

U.S. PATENT DOCUMENTS

| | | | |
|---|---|---|---|
| 3,828,377 | A | 8/1974 | Fary, Sr. |
| 4,029,089 | A | 6/1977 | Mulhlland |
| 4,194,257 | A | 3/1980 | Martin et al. |
| 4,627,119 | A | 12/1986 | Hachey et al. |
| 4,655,200 | A | 4/1987 | Knight |
| 4,705,026 | A | 11/1987 | Chaussy |
| 4,866,796 | A | 9/1989 | Robinson |
| 4,872,656 | A | 10/1989 | Brendgord |
| 4,901,384 | A | 2/1990 | Eary |
| 4,915,101 | A | 4/1990 | Cuccia |
| 5,009,407 | A | 4/1991 | Watanabe |
| 5,013,018 | A | 5/1991 | Sicek |
| 5,088,706 | A | 2/1992 | Jackson |
| 5,103,511 | A | 4/1992 | Sequin |
| 5,131,106 | A | 7/1992 | Jackson |
| 5,362,302 | A | 11/1994 | Jenson et al. |
| 5,390,383 | A | 2/1995 | Carn |
| 5,410,769 | A | 5/1995 | Waterman |
| 5,444,882 | A | 8/1995 | Andrews |
| 5,613,254 | A | 3/1997 | Clayman |
| 5,642,302 | A | 6/1997 | Dumont |
| 5,860,899 | A | 1/1999 | Rassman |
| 5,991,651 | A | 11/1999 | LaBarbera |
| 6,003,176 | A | 12/1999 | Wasley |
| 6,076,525 | A | 6/2000 | Hoffman |
| 6,112,349 | A | 9/2000 | Connolly |
| 6,154,901 | A | 12/2000 | Carr |
| 6,260,220 | B1 | 7/2001 | Lamb |
| 6,295,671 | B1 | 10/2001 | Reesby et al. |
| 6,311,349 | B1 | 11/2001 | Kazakia |
| 6,367,104 | B1 | 4/2002 | Fallbo, Sr. et al. |
| 6,378,149 | B1 | 4/2002 | Sanders et al. |
| 6,516,483 | B1 | 2/2003 | VanSteenburg |
| 6,566,833 | B2 | 5/2003 | Barlett |
| 6,615,430 | B2 | 9/2003 | Heimbrock |
| 6,671,905 | B2 | 1/2004 | Bartlett et al. |
| 6,681,423 | B2 | 1/2004 | Zachrisson |
| 6,701,553 | B1 | 3/2004 | Hand et al. |
| 6,701,554 | B2 | 3/2004 | Heimbrock |
| 6,701,558 | B2 | 3/2004 | VanSteenburg |
| 6,715,169 | B2 | 4/2004 | Niederkrom |
| 6,728,983 | B2 | 5/2004 | Bartlett et al. |
| 6,732,390 | B2 | 5/2004 | Krywiczanin |
| 6,739,006 | B2 | 5/2004 | Borders et al. |
| 6,820,621 | B2 | 11/2004 | DeMayo |
| 6,874,181 | B1 | 4/2005 | Connolly et al. |
| 6,934,986 | B2 | 8/2005 | Krywiczanin et al. |
| 6,941,951 | B2 | 9/2005 | Hubert et al. |
| 6,966,081 | B1 | 11/2005 | Sharps |
| 7,100,225 | B1 | 9/2006 | Bailey |
| 7,152,261 | B2 | 12/2006 | Jackson |
| 7,189,214 | B1 | 3/2007 | Saunders |
| 7,219,379 | B2 | 5/2007 | Krywiczanin et al. |
| 7,234,180 | B2 | 6/2007 | Horton et al. |
| 7,290,302 | B2 | 11/2007 | Sharps |
| 7,343,635 | B2 | 3/2008 | Jackson |
| 7,426,930 | B1 | 9/2008 | Bailey |
| 7,472,440 | B2 | 1/2009 | Bartlett et al. |
| 7,484,253 | B1 | 2/2009 | Coppens |
| 7,496,980 | B2 | 3/2009 | Sharps |
| 7,565,708 | B2 | 7/2009 | Jackson |
| 7,600,281 | B2 | 10/2009 | Skripps |
| 7,669,262 | B2 | 3/2010 | Skripps |
| 7,739,762 | B2 | 6/2010 | Lamb et al. |
| 7,882,583 | B2 | 2/2011 | Skripps |
| 8,060,960 | B2 | 11/2011 | Jackson |
| 8,118,029 | B2 | 2/2012 | Gneiting et al. |
| 8,286,283 | B2 | 10/2012 | Copeland et al. |
| 8,286,637 | B2 | 10/2012 | Kaska |
| 8,381,335 | B2 | 2/2013 | Ahlman |
| 8,413,660 | B2 | 4/2013 | Weinstein et al. |
| 8,439,948 | B1 | 5/2013 | King |
| 8,443,473 | B2 | 5/2013 | Maxwell |
| 8,584,281 | B2 | 11/2013 | Diel et al. |
| 8,635,725 | B2 | 1/2014 | Tannoury et al. |
| 8,677,529 | B2 | 3/2014 | Jackson |
| 8,707,484 | B2 | 4/2014 | Jackson et al. |
| 8,978,180 | B2 | 3/2015 | Jackson |
| 9,072,646 | B2 | 7/2015 | Skripps et al. |
| 9,180,062 | B2 | 11/2015 | Jackson |
| 9,186,291 | B2 | 11/2015 | Jackson et al. |
| 9,226,865 | B2 | 1/2016 | Jackson et al. |
| 9,265,680 | B2 | 2/2016 | Sharps |
| 9,295,433 | B2 | 3/2016 | Jackson et al. |
| 9,308,145 | B2 | 4/2016 | Jackson |
| 9,339,430 | B2 | 5/2016 | Jackson et al. |
| 9,358,170 | B2 | 6/2016 | Jackson |
| 9,402,775 | B2 | 8/2016 | Jackson et al. |
| 9,414,982 | B2 | 8/2016 | Jackson |
| 9,468,576 | B2 | 10/2016 | Jackson |
| 9,498,397 | B2 | 11/2016 | Hight et al. |
| 9,522,078 | B2 | 12/2016 | Pizzini |
| 9,554,959 | B2 | 1/2017 | Carn |
| 9,622,928 | B2 | 4/2017 | Jackson et al. |
| 9,642,760 | B2 | 5/2017 | Jackson et al. |
| 9,655,793 | B2 | 5/2017 | Hertz |
| 9,700,476 | B2 | 7/2017 | Hoel et al. |
| 9,713,562 | B2 | 7/2017 | Perlman et al. |
| 9,744,089 | B2 | 8/2017 | Jackson |
| 9,849,054 | B2 | 12/2017 | Jackson |
| 9,937,006 | B2 | 4/2018 | Skripps et al. |
| 9,993,380 | B2 | 6/2018 | Jackson |
| 10,136,863 | B2 | 11/2018 | Kaiser et al. |
| 10,314,758 | B2 | 6/2019 | Dolliver et al. |
| 10,342,722 | B2 | 7/2019 | Garrido |
| 10,406,054 | B1 | 9/2019 | Scholl et al. |
| 10,426,684 | B2 | 10/2019 | Dubois et al. |
| 10,531,998 | B2 | 1/2020 | Jackson et al. |
| 10,543,142 | B2 | 1/2020 | Lim et al. |
| 10,548,796 | B2 | 2/2020 | Lim et al. |
| 10,576,006 | B2 | 3/2020 | Lim et al. |
| 10,695,252 | B2 | 6/2020 | Jackson |
| 10,722,413 | B2 | 7/2020 | Lim et al. |
| 10,729,607 | B2 | 8/2020 | Jackson |
| 10,751,240 | B2 | 8/2020 | Lim et al. |
| 10,835,438 | B2 | 11/2020 | Jackson |
| 10,835,439 | B2 | 11/2020 | Lim et al. |
| 10,849,809 | B2 | 12/2020 | Lim et al. |
| 10,874,570 | B2 | 12/2020 | Lim et al. |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,898,401 | B2 | 1/2021 | Lim et al. |
| 10,900,448 | B2 | 1/2021 | Lim et al. |
| 2002/0138905 | A1 | 10/2002 | Barltett et al. |
| 2002/0138906 | A1 | 10/2002 | Barltett et al. |
| 2002/0157186 | A1 | 10/2002 | VanSteenburg |
| 2003/0140419 | A1 | 7/2003 | Barltett et al. |
| 2003/0140420 | A1 | 7/2003 | Niederkrom |
| 2003/0145382 | A1 | 8/2003 | Krywiczanin |
| 2003/0178027 | A1 | 9/2003 | DeMayo et al. |
| 2004/0010849 | A1 | 1/2004 | Krywiczanin et al. |
| 2004/0133979 | A1 | 7/2004 | Newkirk et al. |
| 2004/0133983 | A1 | 7/2004 | Newkirk |
| 2005/0181917 | A1 | 8/2005 | Dayal |
| 2006/0037141 | A1 | 2/2006 | Krywiczanin et al. |
| 2006/0123546 | A1 | 6/2006 | Horton |
| 2006/0162076 | A1 | 7/2006 | Bartlett et al. |
| 2006/0162084 | A1 | 7/2006 | Mezue |
| 2006/0185090 | A1 | 8/2006 | Jackson |
| 2008/0034502 | A1 | 2/2008 | Copeland et al. |
| 2008/0134434 | A1 | 6/2008 | Celauro |
| 2008/0222811 | A1 | 9/2008 | Gilbert et al. |
| 2009/0070936 | A1 | 3/2009 | Henderson |
| 2009/0139030 | A1 | 6/2009 | Yang |
| 2009/0248041 | A1 | 10/2009 | Williams et al. |
| 2010/0037397 | A1 | 2/2010 | Wood |
| 2010/0192300 | A1 | 8/2010 | Tannoury |
| 2010/0293719 | A1 | 11/2010 | Klemm et al. |
| 2011/0099716 | A1 | 5/2011 | Jackson |
| 2012/0103344 | A1 | 5/2012 | Hunter |
| 2012/0144589 | A1 | 6/2012 | Skripps et al. |
| 2012/0255122 | A1 | 10/2012 | Diel et al. |
| 2013/0111666 | A1 | 5/2013 | Jackson |

(56) References Cited

U.S. PATENT DOCUMENTS

| | | | |
|---|---|---|---|
| 2013/0191994 | A1 | 8/2013 | Bellows et al. |
| 2013/0283526 | A1 | 10/2013 | Gagliardi |
| 2013/0307298 | A1 | 11/2013 | Meiki |
| 2014/0020183 | A1 | 1/2014 | Dominick |
| 2014/0059773 | A1 | 3/2014 | Carn |
| 2014/0068861 | A1 | 3/2014 | Jackson |
| 2014/0109316 | A1 | 4/2014 | Jackson et al. |
| 2014/0130258 | A1 | 5/2014 | Kobuss |
| 2014/0137327 | A1 | 5/2014 | Tannoury et al. |
| 2015/0038982 | A1 | 2/2015 | Kilroy et al. |
| 2015/0044956 | A1 | 2/2015 | Hacker |
| 2015/0245971 | A1 | 9/2015 | Bernardoni et al. |
| 2015/0272681 | A1 | 10/2015 | Skripps et al. |
| 2016/0000621 | A1 | 1/2016 | Jackson |
| 2016/0081582 | A1 | 3/2016 | Rapoport |
| 2016/0089287 | A1 | 3/2016 | Buerstner |
| 2016/0193099 | A1 | 7/2016 | Drake |
| 2016/0317373 | A1 | 11/2016 | Jackson et al. |
| 2017/0027797 | A1 | 2/2017 | Dolliver et al. |
| 2017/0049651 | A1 | 2/2017 | Lim |
| 2017/0049653 | A1 | 2/2017 | Lim |
| 2017/0079864 | A1 | 3/2017 | Riley |
| 2017/0112698 | A1 | 4/2017 | Hight et al. |
| 2017/0135891 | A1 | 5/2017 | Kettner |
| 2017/0151115 | A1 | 6/2017 | Jackson |
| 2017/0341232 | A1 | 11/2017 | Perplies |
| 2017/0348171 | A1 | 12/2017 | Jackson |
| 2018/0116891 | A1 | 5/2018 | Beale et al. |
| 2018/0185228 | A1 | 7/2018 | Catacchio et al. |
| 2018/0193104 | A1 | 7/2018 | Beale et al. |
| 2018/0207044 | A1 | 7/2018 | Sabet et al. |
| 2018/0363596 | A1 | 12/2018 | Lim et al. |
| 2019/0000702 | A1 | 1/2019 | Lim et al. |
| 2019/0000707 | A1 | 1/2019 | Lim et al. |
| 2019/0046381 | A1 | 2/2019 | Lim et al. |
| 2019/0046383 | A1 | 2/2019 | Lim et al. |
| 2019/0209409 | A1 | 7/2019 | Jackson et al. |
| 2019/0374420 | A1 | 12/2019 | Lehman et al. |
| 2020/0000668 | A1 | 1/2020 | Lim et al. |
| 2020/0060913 | A1 | 2/2020 | Lim et al. |
| 2020/0060914 | A1 | 2/2020 | Lim et al. |
| 2020/0060915 | A1 | 2/2020 | Lim et al. |
| 2020/0138660 | A1 | 5/2020 | Jackson |
| 2020/0170868 | A1 | 6/2020 | Jackson |
| 2020/0188208 | A1 | 6/2020 | Lim et al. |
| 2020/0138659 | A1 | 7/2020 | Lim et al. |
| 2020/0281788 | A1 | 9/2020 | Lim et al. |
| 2020/0297568 | A1 | 9/2020 | Lim et al. |
| 2020/0337923 | A1 | 10/2020 | Lim et al. |
| 2020/0337926 | A1 | 10/2020 | Lim et al. |
| 2020/0337927 | A1 | 10/2020 | Lim et al. |
| 2020/0360214 | A1 | 11/2020 | Lim et al. |
| 2022/0008016 | A1 | 1/2022 | Harrison et al. |
| 2022/0409311 | A1 | 12/2022 | Tadano et al. |
| 2023/0066826 | A1 * | 3/2023 | Morgan ............... A61G 13/123 |

FOREIGN PATENT DOCUMENTS

| | | |
|---|---|---|
| EP | 3909539 | 11/2021 |
| JP | 2018069048 | 5/2018 |
| JP | 6449958 | 12/2018 |
| WO | WO0062731 | 10/2000 |
| WO | 2007058673 | 5/2007 |
| WO | 2021176531 | 9/2021 |

OTHER PUBLICATIONS

International Search Report and Written Opinion dated Jun. 27, 2023 in PCT/IL2023/050291.

International Search Report and Written Opinion dated Jul. 20, 2023 in PCT/IB2023/054218.

International Search Report and Written Opinion dated Oct. 18, 2023 in PCT/IB2023/058416.

International Search Report and Written Opinion dated Jul. 20, 2023 in PCT/IB2023/054786.

* cited by examiner

SURGICAL TABLE

FIELD

The present technology generally relates to a surgical table having a first platform portion and a second platform portion that can be used to adjust a corresponding first portion and a corresponding second portion of a patient relative to one another before, during, and after surgery.

BACKGROUND

Typically, conventional surgical tables include some form of patient articulation, but such patient articulation afforded thereby is often quite limited. For example, sometimes the conventional surgical tables can afford a limited degree of flexion or extension of the spine of the patient by lifting a portion of the torso of the patient in a upward direction and a downward direction. The patient articulation afforded by the convention surgical tables is limited because patient platforms thereof are typically horizontally-oriented, and the patient articulation is relative to the horizontal orientations of the patient platforms. That is, adjustment mechanisms used to manipulate the patient are integrated into the horizontally-oriented patient platforms, and the limits of the corresponding adjustment is oftentimes constrained by such integration. Other types of surgical tables include patient platform portions that are attached to and articulatable with respect one another. Because such patient platform portions are attached to one another, corresponding movement of the patient platforms are constrained by such attachment. Oftentimes, the movement of such patient platforms is limited to only one axis or in one plane. Therefore, in order to enhance patient articulation, there is a need for a surgical table that includes a first platform portion and a second platform portion that are independently moveable with respect to one another. Such a surgical table incorporating the first platform portion and the second platform portion can include a gap spacing apart the first platform portion and the second platform portion. And the independent movement of the first platform portion and the second platform portion of such a surgical table can correspondingly position/orient and reposition/reorient a first portion of the patient's body supported by the first platform portion, and a second portion of the patient's body supported by the second platform portion relative to one another.

SUMMARY

The techniques of this disclosure generally relate to a surgical table for performing surgery on a patient supported thereby, with a first platform portion and a second platform portion of the surgical table capable of supporting a first portion and a second portion, respectively, of the patient thereon. The first platform portion and the second platform portion can be independently moveable with respect to one another to afford positioning/orienting and repositioning/reorienting the patient's body relative to the surgical robot before, during, and after surgery.

In one aspect, the present disclosure provides a surgical table including a support portion including a first end, an opposite second end, a mid-longitudinal axis extending through the first end and the second end, a first end portion at and adjacent the first end, a second end portion at and adjacent the second end, and a cross member extending between the first end portion and the second end portion, the first end portion including a first slider portion and a rotator portion supported by the first slider portion, and the second end portion including a second slider portion; a first platform portion, and a first vertically-oriented portion supporting the first platform portion relative to the rotator portion of the first end portion, the first platform portion including a first end, an opposite second end, a first end portion at the first end of the first platform portion, a second end portion at the second end of the first platform portion, at least a first rail and a second rail extending between the first end portion and the second end portion of the first platform portion, a head support, and a chest support supported by the at least the first rail and the second rail of the first platform portion, and the first vertically-oriented portion vertically spacing the first platform portion apart from the support portion; and a second platform portion, and a second vertically-oriented portion supporting the second platform portion relative to the second slider portion of the second end portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, and the second vertically-oriented portion vertically spacing the second platform portion apart from the support portion; where the first platform portion and the second platform portion are positioned adjacent to one another and separated by a gap between the first end of the first platform portion and the second end of the second platform portion; and where the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

In another aspect, the present disclosure provides a surgical table including a support portion including a first end, an opposite second end, a mid-longitudinal axis extending through the first end and the second end, a first end portion at and adjacent the first end, a second end portion at and adjacent the second end, and a cross member extending between the first end portion and the second end portion, the first end portion including a first slider portion and a rotator portion supported by the first slider portion, and the second end portion including a second slider portion; a first platform portion, a first vertically-oriented portion supporting the first platform portion relative to the rotator portion of the first end portion, the first platform portion including a first end, an opposite second end, a first end portion at the first end of the first platform portion, a second end portion at the second end of the first platform portion, at least a first rail and a second rail extending between the first end portion and the second end portion of the first platform portion, a head support, and a chest support supported by the at least the first rail and the second rail of the first platform portion, the first vertically-oriented portion being expandable and contractable, and vertically spacing the first platform portion apart from the support portion; and a second platform portion, a second vertically-oriented portion supporting the second platform portion relative to the second slider portion of the second end portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, the second vertically-oriented portion being expandable and contractable, and vertically spacing the second platform portion apart from the support portion; where the first platform portion and the second platform portion are positioned adjacent to one another and separated by a gap between the first end of the first platform portion and the second end of the second platform portion; where a first adjustment portion is positioned one of between the first platform portion and the first vertically-oriented portion and between the second platform portion and the second vertically-oriented portion, the first adjustment portion being configured to tilt a first corresponding one of the first platform portion and the second platform portion upwardly and downwardly relative to the support portion, and to rotate the first corresponding one of the first platform portion and the second platform portion side-to-side relative to the support portion; and where the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

In yet another aspect, the present disclosure provides a surgical table including a support portion including a first end, an opposite second end, a mid-longitudinal axis extending through the first end and the second end, a first end portion at and adjacent the first end, a second end portion at and adjacent the second end, and a cross member extending between the first end portion and the second end portion, the first end portion including a first slider portion and a rotator portion supported by the first slider portion, and the second end portion including a second slider portion; a first platform portion, a first vertically-oriented portion supporting the first platform portion relative to the rotator portion of the first end portion, and a first adjustment portion positioned between the first platform portion and the first vertically-oriented portion, the first platform portion including a first end, an opposite second end, a first end portion at the first end of the first platform portion, a second end portion at the second end of the first platform portion, at least a first rail and a second rail extending between the first end portion and the second end portion of the first platform portion, a head support, and a chest support supported by the at least the first rail and the second rail of the first platform portion, the first vertically-oriented portion being expandable and contractable, and vertically spacing the first platform portion apart from the support portion, and the first adjustment portion being configured to tilt the first end of the first platform portion upwardly and downwardly relative to the support portion, and to rotate the first platform portion side-to-side relative to the support portion; and a second platform portion, a second vertically-oriented portion supporting the second platform portion relative to the second slider portion of the second end portion, and a second adjustment portion positioned between the second platform portion and the second vertically-oriented portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, the second vertically-oriented portion vertically spacing the second platform portion apart from the support portion, and the second adjustment portion being configured to tilt the second end of the second platform portion upwardly and downwardly relative to the support portion, and to rotate the second platform portion side-to-side relative to the support portion; where the first platform portion and the second platform portion are positioned adjacent to one another and separated by a gap between the first end of the first platform portion and the second end of the second platform portion; and where the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The techniques of this disclosure generally relate to a surgical table.

DETAILED DESCRIPTION

Figure 1A:
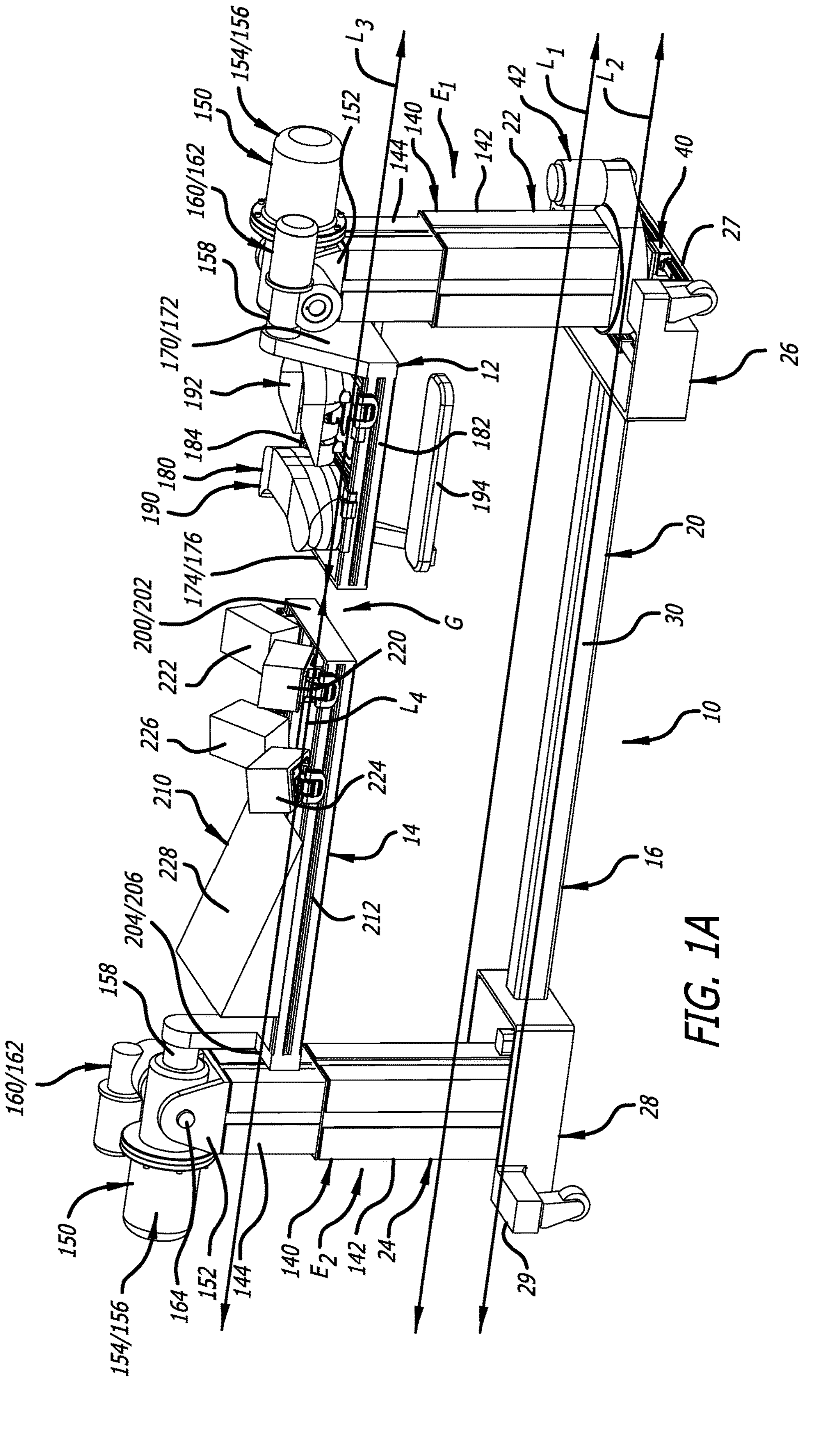
FIG. 1A is a side, perspective view that illustrates a surgical table of the present disclosure.

A preferred embodiment of a surgical table of the present disclosure is generally indicated by the numeral 10 in FIGS. 1A-1C and 6-12. The surgical table 10 includes a first end E1, a second end E2, and a mid-longitudinal L1 extending through the first end E1 and the second end E2. The surgical table 10 includes a first platform portion 12, a second platform portion, 14 and a support portion 16. The support portion 16 supports the first platform portion 12 and the second 14 above the ground, and the first platform portion 12 and the second platform portion 14 can each support a portion of a patient P thereon.

The first platform portion 12 and the second platform portion 14, as depicted in FIGS. 1A-1C and 6-12, are spaced apart from another across a gap G, and can be independently positioned/oriented and repositioned/reoriented relative to one another. Together, when the patient is supported thereby, adjustment of the first platform portion 12 and the second platform portion 14 relative to one another can be used to manipulate and provide access to the spine of the patient. The manipulation of the patient P and the access afforded by the gap G can aid the performance of surgery on the patient P, and such surgery, for example, can include spinal surgery on the spine of the patient.

The support portion 16, as depicted in FIGS. 1A and 6-12, includes a horizontally-oriented portion 20, a first vertically-oriented portion 22, and a second vertically-oriented portion 24. The horizontally-oriented portion 20 is used in supporting the first vertically-oriented portion 22 and the second vertically-oriented portion 24 relative to the ground, the first vertically-oriented portion 22 is used in supporting the first platform portion 12 relative to the horizontally-oriented portion 20, and the second vertically-oriented portion 24 is used in supporting the second platform portion 14 relative to the horizontally-oriented portion 20. The surgical table 10, as discussed below, can include a controller or controllers for controlling motorized actuators included in the surgical table 10 to facilitate the operation thereof.

As depicted in FIG. 1A, the horizontally-oriented portion 20 includes a first end portion 26 at a first end 27 thereof (collocated with the first end E1), a second end portion 28 at a second end 29 thereof (collocated with the second end E2), and a cross member 30 extending between the first end portion 26 and the second end portion 26. The cross member 30 can be aligned with a mid-longitudinal axis L2 of the horizontally-oriented portion 20, can be used to connect the first end portion 26 and the second end portion 28, and can be expandable and contractable to expand and contract a length of the horizontally-oriented portion 20 along the mid-longitudinal axis L2.

Figure 2:
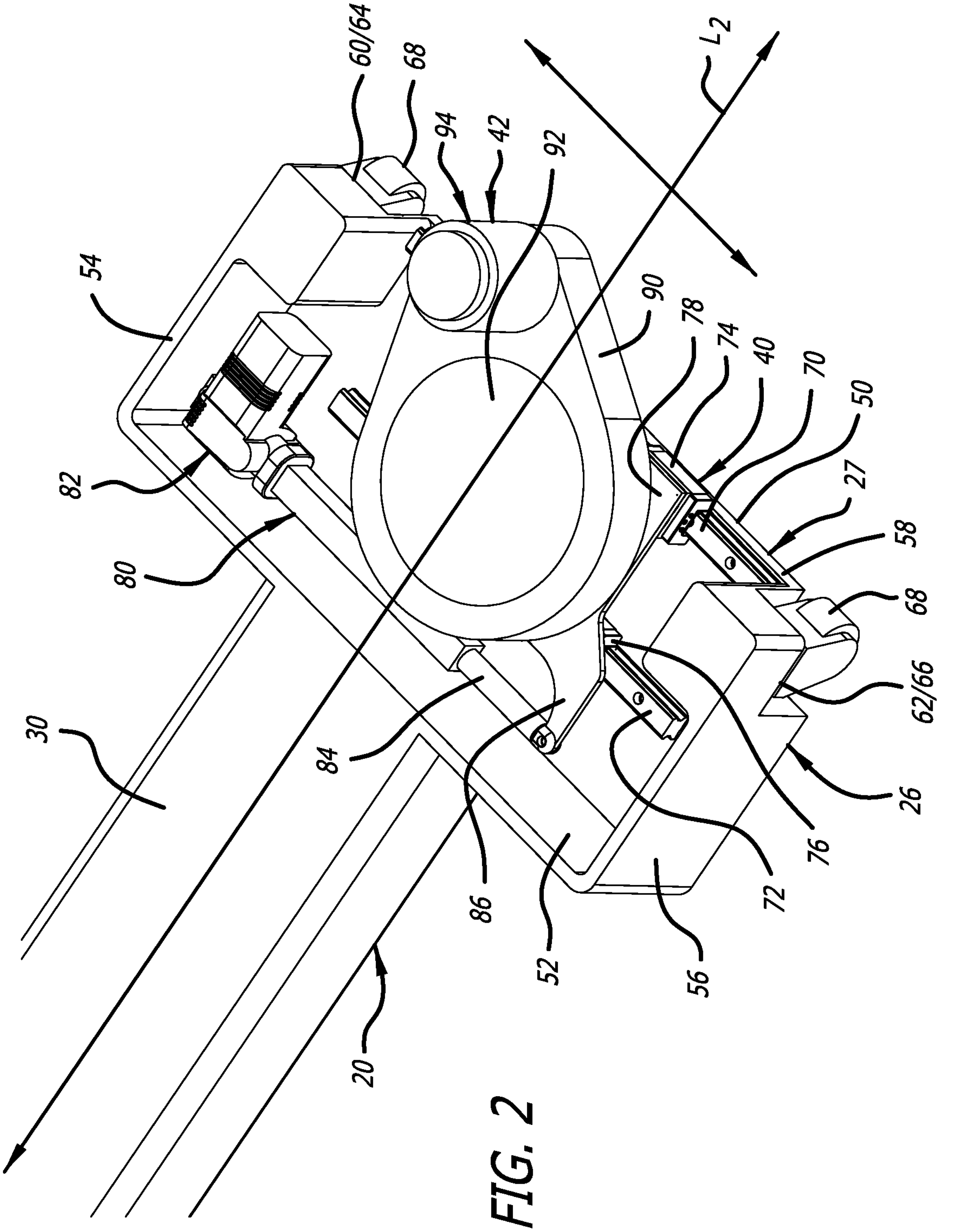
FIG. 2 is a top, perspective view that illustrates a slider portion and a rotatable portion of a first end portion of the surgical table of FIG. 1A.
Figure 3:
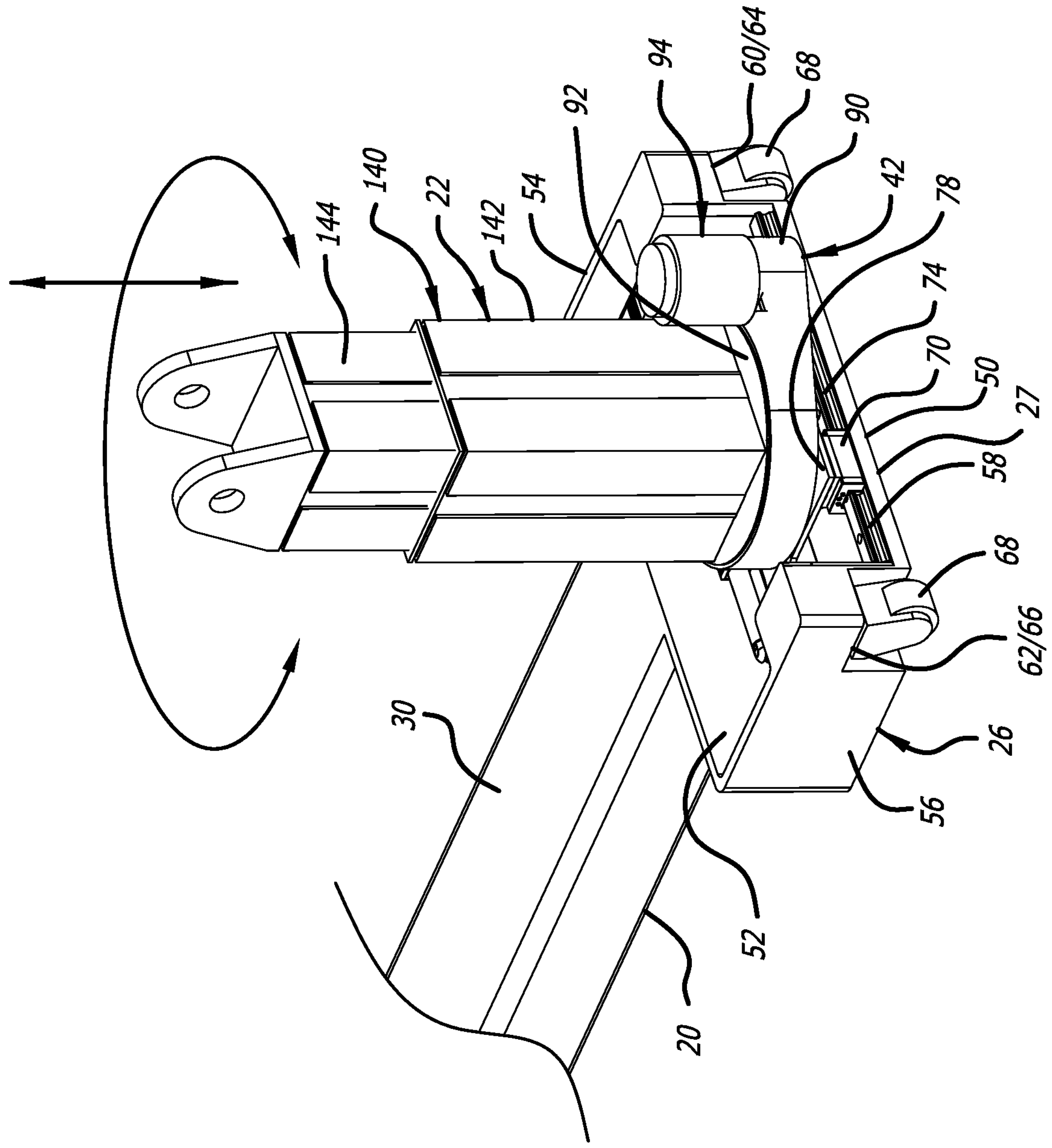
FIG. 3 is an end, perspective view that illustrates the slider portion and the rotatable portion of the first end portion supporting a first vertically-oriented portion of the surgical table of FIG. 1A.

The first end portion 26, as depicted in FIGS. 2 and 3, supports the first vertically-oriented portion 22, and includes a slider portion 40 and a rotator portion 42. As discussed below, the slider portion 40 is configured to move the first vertically-oriented portion 22 in directions transverse to the mid-longitudinal axes L1 and L2, and the rotator portion 42 is configured to rotate the first vertically-oriented portion 22 about a vertically-oriented axis. As depicted in FIGS. 2 and 3, the first end portion 26 includes a bottom portion 50, an endwall portion 52, a first sidewall portion 54, and a second sidewall portion 56.

The first end portion 26 includes an open end 58 adjacent the first end 27, and together, the bottom portion 50, the endwall portion 52, the first sidewall portion 54, and the second sidewall portion 56 define an area in which the slider portion 40 and the rotator portion 42 are provided. Furthermore, the first sidewall portion 54 and the second sidewall portion 56 include indentations 60 and 62 that include undersurfaces 64 and 66, respectively. Casters 68 can be attached to each of the undersurfaces 64 and 66, and together with other casters, the casters 68 can be used to space the support portion 16 from the ground and to facilitate movement of the support portion 16.

The slider portion 40, as depicted in FIGS. 2 and 3, includes a first track portion 70, a second track portion 72, first trucks 74 moveable along the first track portion 70, second trucks 76 moveable along the second track portion 72, and a platform portion 78 supported by the first trucks 74 and the second trucks 76. Using movement of the first trucks 74 and the second trucks 76 on the first track portion 70 and the second track portion 72, respectively, the platform portion 78 is moveable relative to the bottom portion 50 in side-to-side directions transverse to the mid-longitudinal axes L1 and L2 between a first position and a second position. In the first position, a majority of the platform portion 78 is located on one side of the mid-longitudinal axis L2, and, in the second position, a majority of the platform portion 78 is located on the other side of the mid-longitudinal axis L2.

Linear movement of the platform portion 78 can be controlled via operation of an actuator 80 that includes a motor and transmission portion 82 that is actuatable to move a telescoping arm portion 84 inwardly and outwardly. The telescoping arm portion 84 is attached to an extension portion 86 that extends outwardly from the platform portion 78. As such, the inward movement and the outward movement of the telescoping arm portion 84 serves to move the platform portion 78 (and the first vertically-oriented portion 22 supported thereby) between the first position and the second position thereof. As such, the first platform portion 12 supported by the first vertically-oriented portion 22 can be moved in side-to-side directions relative to the mid-longitudinal axes L1 and L2 via actuation of the actuator 80 of the slider portion 40. Furthermore, the operation of the slider portion 40 and the actuator 80 thereof can be controlled by the controllers of the surgical table 10.

As depicted in FIG. 3, the platform portion 78 can support the rotator portion 42 thereon, and the rotator portion 42 can support the first vertically-oriented portion 22 thereon. The rotator portion 42 can include a base portion 90, a rotatable portion 92, and an actuator 94. Rotation of the rotatable portion 92 can be controlled via operation of the actuator 94 that includes a motor and transmission portion 94 that is actuatable to rotate the rotatable portion 92 and the first vertically-oriented portion 22 supported by the rotatable portion 92 about a vertically-oriented axis. As such, the first platform portion 12 can be rotated relative to the platform portion 78, the first end portion 26, and the support portion 16 via actuation of the actuator 94 of the rotator portion 42. Furthermore, the operation of the rotator portion 42 and the actuator 94 thereof can be controlled by the controllers of the surgical table 10.

Figure 4:
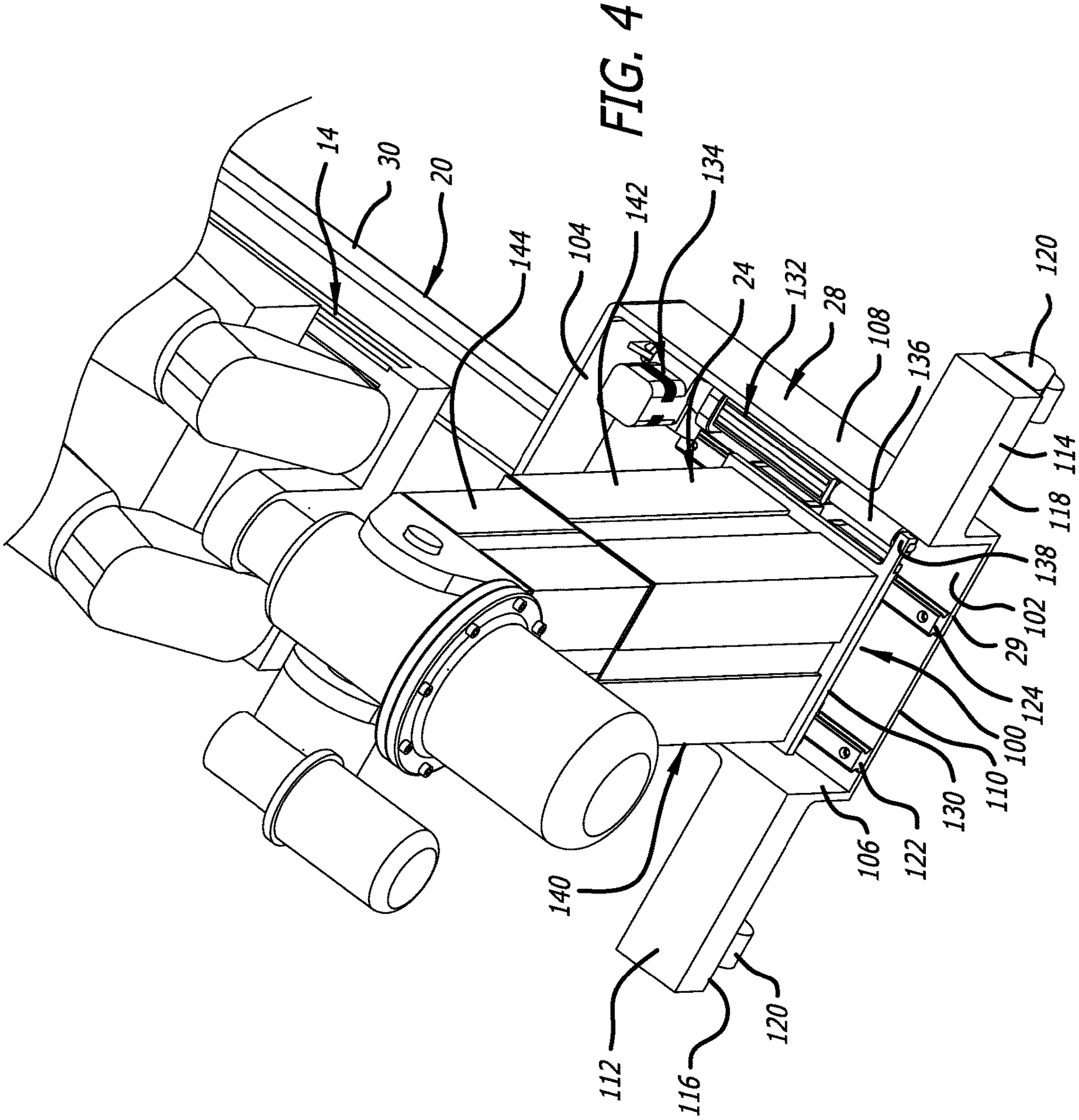
FIG. 4 is a top, perspective view that illustrates a slider portion of a second end portion supporting a second vertically-oriented portion of the surgical table of FIG. 1A.
Figure 5:
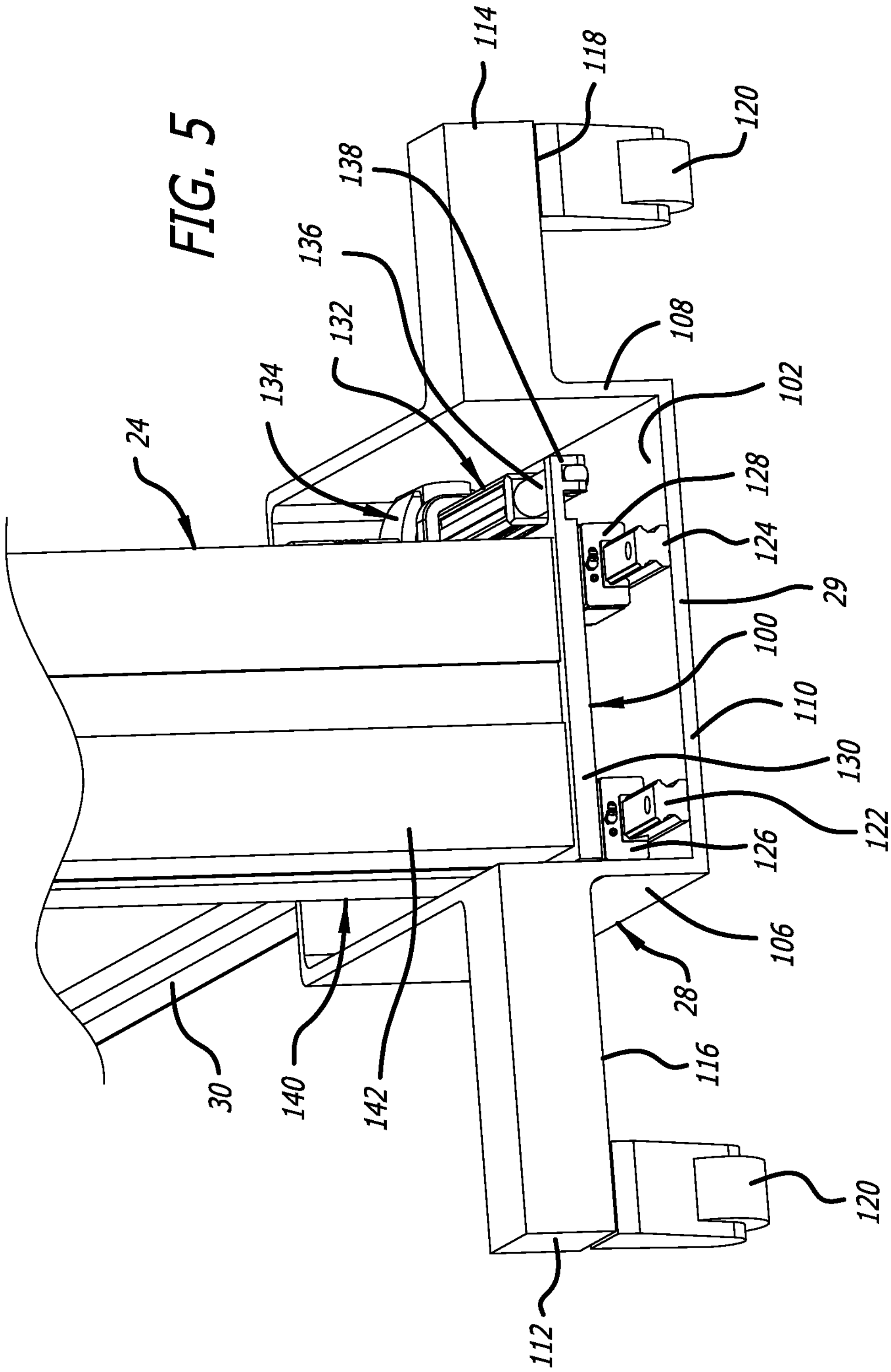
FIG. 5 is an end, perspective view that illustrates the slider portion of the second end portion supporting the second vertically-oriented portion of the surgical table of FIG. 1A.

The second end portion 28, as depicted in FIGS. 4 and 5, supports the second vertically-oriented portion 24, and includes a slider portion 100. As discussed below, the slider portion 100 is configured to move the second vertically-oriented portion 24 toward and away from the first vertically-oriented portion 22 in directions aligned with the longitudinal axes L1 and L2. As depicted in FIGS. 4 and 5, the second end portion 28 includes a bottom portion 102, an endwall portion 104, a first sidewall portion 106, and a second sidewall portion 108.

The second end portion 28 includes an open end 110 adjacent the second end 29, and together, the bottom portion 102, the endwall 104, the first sidewall portion 106, and the second sidewall portion 108 define an area in which the slider portion 100 are provided. An arm portion 112 extends outwardly from the first sidewall portion 106 and an arm portion 114 extends outwardly from the second sidewall portion 108, and the arm portions 112 and 114 include undersurfaces 116 and 118, respectively. Casters 120 can be attached to each of the undersurfaces 116 and 118, and together with the casters 68, the casters 120 can be used to space the support portion 16 from the ground and to facilitate movement of the support portion 16.

The slider portion 100, as depicted in FIGS. 4 and 5, includes a first track portion 122, a second track portion 124, first trucks 126 moveable along the first track portion 122, second trucks 128 moveable along the second track portion 124, and a platform portion 130 supported by the first trucks 126 and the second trucks 128. Using movement of the first trucks 126 and the second trucks 128 on the first track portion 122 and the second track portion 124, respectively, the platform portion 130 is moveable relative to the bottom portion 102 in directions aligned with the longitudinal axes L1 and L2 between a first position and a second position. In the first position, the platform portion 130 is located adjacent the second end 29, and, in the second position, the platform portion 130 is located adjacent the endwall portion 104.

Linear movement of the platform portion 130 can be controlled via operation of an actuator 132 that includes a motor and transmission portion 134 that is actuatable to move a telescoping arm portion 136 inwardly and outwardly. The telescoping arm portion 136 is attached to an extension portion 138 that extends outwardly from the platform portion 130. As such, the inward movement and the outward movement of the telescoping arm portion 138 serves to move the platform portion 130 (and the second vertically-oriented portion 24 supported thereby) between the first position and the second position thereof. As such, the second platform portion 14 supported by the second vertically-oriented portion 24 can be moved toward and away from the first platform portion 12 in directions aligned with the mid-longitudinal axes L1 and L2 via actuation of the actuator 132 of the slider portion 100. Furthermore, the operation of the slider portion 100 and the actuator 132 thereof can be controlled by the controllers of the surgical table 10.

As discussed below, the use of the slider portion 40 and the rotator portion 42 of the first end portion 26, and the use of the slider portion 100 of the second end portion 28 can afford independent movement and adjustment of the first platform portion 12 and the second platform portion 14 relative to one another. Furthermore, rather than employing the slider portion 40 and the rotator portion 42, the first vertically-oriented portion 22 can be supported directly by the first end portion 26 and be fixed in position relative thereto, and rather than employing the slider portion 100, the second vertically-oriented portion 24 can be supported directly by the second end portion 28. As such, if the slider portion 40, the rotatable portion 42, and the slider portion 100 are not provided, portions of the first vertically-oriented portion 22 and the second vertically-oriented portion 24 can be used to facilitate independent movement and adjustment of the first platform portion 12 and the second platform portion 14 relative to one another.

As depicted in FIGS. 1A, 1B, and 6-12, each of the first vertically-oriented portion 22 and the second vertically oriented 24 can include a telescoping column 140 for positioning/orienting and repositioning/reorienting the first platform portion 12 and the second platform portion 14 relative to the horizontally-oriented portion 20. Each of the telescoping columns 140 can include a lower portion 142 and an upper portion 144. The upper portions 144 can be telescopically moved upwardly and downwardly relative to the lower portions 142 between a lower position and an upper position. The lower portions 142 of the telescoping columns 140 are supported by the first end portion 26 and the second end portion 28. As such, the telescopic expansion and contraction of the telescoping columns 140 can be used to correspondingly raise and lower the first platform portion 12 and the second platform portion 14 relative to the horizontally-oriented portion 20.

Figure 1B:
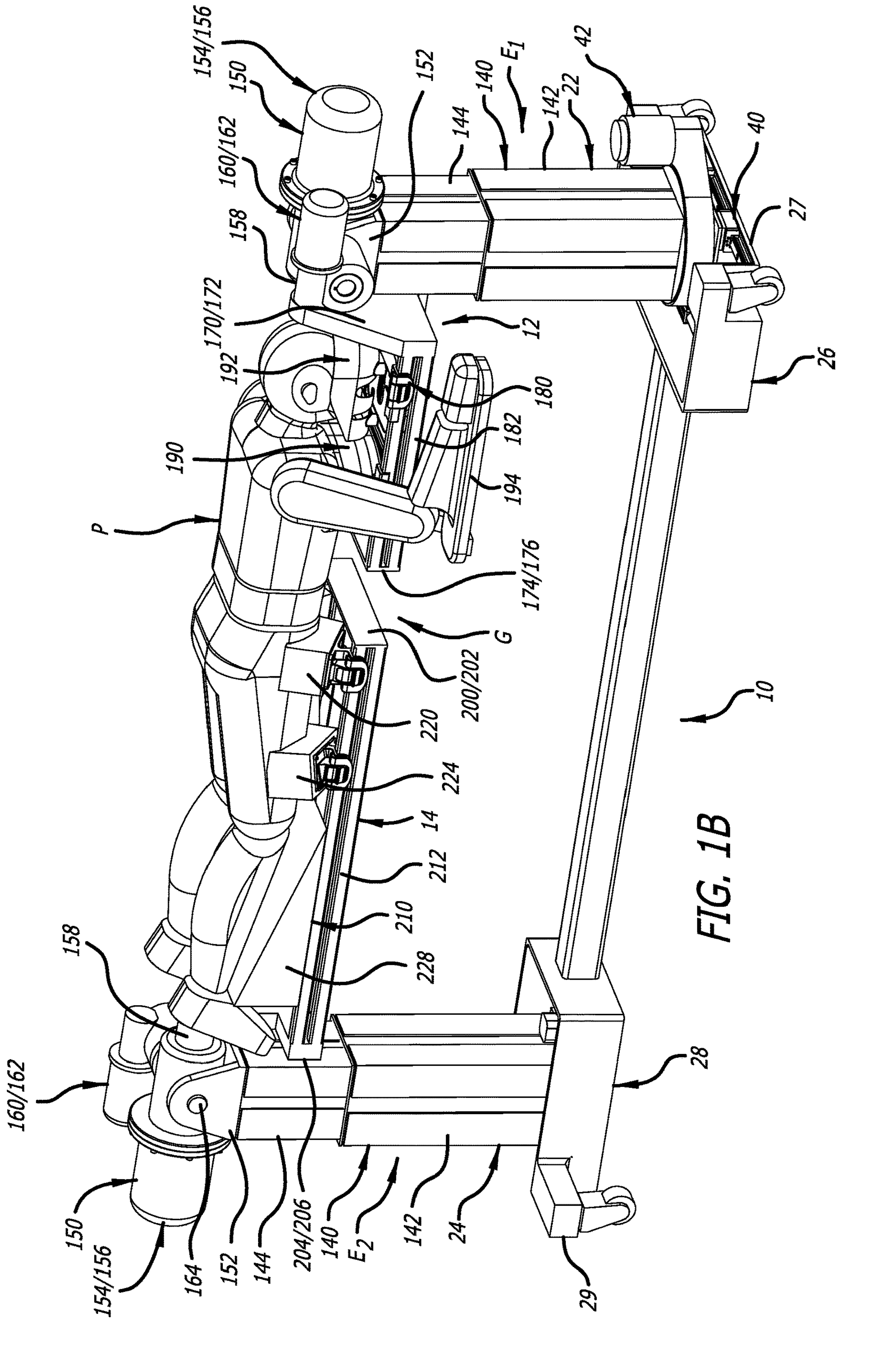
FIG. 1B is a side, perspective view similar to FIG. 1A that illustrates the surgical table of FIG. 1A with a patient positioned thereon in a prone position.
Figure 1C:
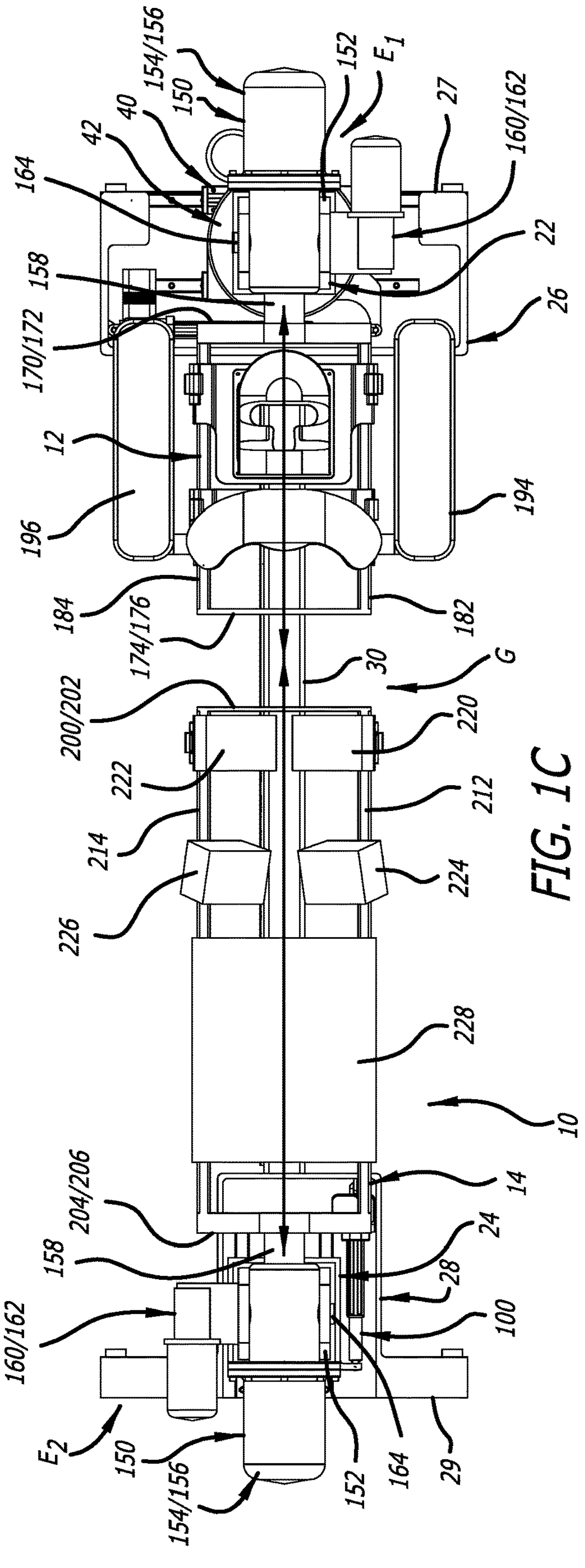
FIG. 1C is a top, plan view that illustrates the surgical table of FIG. 1A with the patient positioned thereon.

As depicted in FIGS. 1A, 1B, and 6-12, each of the first vertically-oriented portion 22 and the second vertically-oriented portion 24 also include a rotational/tilt positioner 150. Each of the rotational/tilt positioners 150 can be supported relative to the telescoping column 140 by a clevis 152 attached to the upper portion 144. The rotational/tilt positioners 150 each include a rotational portion 154 including a motor and transmission 156 and an axle 158, and a tilt portion 160 including a motor and transmission 162 and an axle 164. As depicted in FIGS. 1A-1C, portions of the motors and transmissions 156 of the rotational portions 154 can be positioned between portions of the clevis 152, and the axles 158 can extend outwardly from the motors and transmissions 156 and be attached to the first platform portion 12 and the second platform portion 14. Furthermore, the motors and transmissions 162 of the tilt portions 160 can be positioned on one side of portions of the clevises 152, and the axles 164 can be received through the clevises 152 and be attached to portions of the rotational portions 154. Operation of the motors and transmissions 156 serve in rotating the axle 158 to rotate the first platform portion 12 and the second platform portion 14 attached thereto, and operation of the motors and transmissions 162 serves in rotating the axles 164 to tilt the rotational portions 154 and the first platform portion 12 and the second platform portion 14 attached thereto.

Accordingly, to further position/orient and reposition/reorient the first platform portion 12 and the second platform portion 14, the platform portion 12 and the second platform portion 14 each can be raised and lowered via expansion and contraction of the telescoping columns 140, the first platform portion 12 and the second platform portion 14 each can be rotated side to side by rotation of the axles 158 using the motors and transmissions 156, and the first platform portion 12 and the second platform portion 14 can be tilted upwardly or downwardly by rotation of the axles 164 using the motors and transmissions 162. The rotation of the axles 158 can rotate the first platform portion 12 and the second platform portion 14 side to side in a vertical plane perpendicular to the mid-longitudinal axes L1 and L2, and the rotation of the axles 164 can tilt the first platform portion 12 and the second platform portion 14 upwardly and downwardly in a vertical plane aligned with the mid-longitudinal axes L1 and L2 As discussed below, the operation of the telescoping columns 140, the motors and transmissions 156, and the motors and transmissions 162 can be controlled by the controllers of the surgical table 10.

As depicted in FIGS. 1A-1C, the first platform portion 12 includes a first end portion 170 at and adjacent a first end 172 thereof, a second end portion 174 at and adjacent a second end 176 thereof, and various rails positioned therebetween that connect the first end portion 170 and the second end portion 174 to one another. A portion of first end portion 170 has a height sufficient enough to afford attachment relative to the axle 158 of the rotational/tilt positioner 150 of the first vertically-oriented portion 22, and such attachment affords movement thereof via operation of the rotational/tilt positioner 150.

The first platform portion 12 includes a first patient support portion 180, and the various rails, as depicted in FIGS. 1A and 1C, can include a first outer rail 182 and a second outer rail 184 that extend between the first end portion 170 and the second end portion 174. First end portions of the first outer rail 182 and the second outer rail 184 can be attached to the first end portion 170, opposite second end portions of the first outer rail 182 and the second outer rail 184 can be attached to the second end portion 174, and/or the first and second end portions can be attached to intermediate portions (not shown) positioned between the various rails and the first end portion 170 and/or the second end portion 174. Furthermore, the first outer rail 182 and the second outer rail 184 can be aligned with a mid-longitudinal axis L3 of the first platform portion 12, with the first outer rail 182 being positioned on one side of the mid-longitudinal axis L3, and the second outer rail 184 being positioned on the other side of the mid-longitudinal axis L3.

In addition to providing structural rigidity to the first platform portion 12, the first outer rail 182 and the second outer rail 184 can also be used to support the first patient support portion 180 of the first platform portion 12. The patient support portion 180 can include a chest support portion 190 and a head support portion 192 that are integrated with or separate from one another. As depicted in FIG. 1C, the chest support portion 190 and the head support portion 192 are separate from one another. Furthermore, the chest support portion 190 and/or the head support portion 192 can be moveably adjusted or fixed in position along portions of the first outer rail 182 and the second outer rail 184 to accommodate differently-sized patients. As such, the first outer rail 182 and the second outer rail 184 serves as tracks affording movement of the chest support portion 190 and the head support portion 192. As depicted in FIGS. 1B and 6-12, the patient P is supported in a prone position by the first patient support portion 180, with the upper torso of the patient being supported by the chest support portion 190, and the head of the patient being supported by the head support portion 192. The chest support portion 190 and the head support portion 192 can be configured and operate in similar fashion to those disclosed in U.S. Ser. Nos. 17/740,559 and 17/740,588, both filed May 10, 2022, which are hereby incorporated by reference herein.

In addition to the chest support portion 190 and the head support portion 192, first and second arm supports 194 and 196 can be provided as part of the first platform portion 12 to support arms of the patient relative to the remaining portions thereof. As depicted in FIG. 1C, the first arm support 194 is attached relative to the first outer rail portion 182, and the second arm support 196 is attached relative to the second outer rail portion 184. As such, when the patient P is in the prone position with the upper torso of the patient supported by the chest support portion 190 and the head of the patient supported by the head support portion 192, the right arm and the left arm of the patient can be supported relative to the remainder of the first platform portion 12 by the first arm support 194 and the second arm support 196, respectively.

As depicted in FIGS. 1A-1C, the second platform portion 14 includes a first end portion 200 at and adjacent a first end 202 thereof, a second end portion 204 at and adjacent a second end 206 thereof, and various rails positioned therebetween that connect the first end portion 200 and the second end portion 204 to one another. A portion of second end portion 204 has a height sufficient enough to afford attachment relative to the axle 158 of the rotational/tilt positioner 150 of the second vertically-oriented portion 24, and such attachment affords movement thereof via operation of the rotational/tilt positioner 150.

The second platform portion 14 includes a second patient support portion 210, and the various rails, as depicted in FIGS. 1A and 1C, can include a first outer rail 212 and a second outer rail 214 that extend between the first end portion 200 and the second end portion 204. First end portions of the first outer rail 212 and the second outer rail 214 can be attached to the first end portion 200, opposite second end portions of the first outer rail 212 and the second outer rail 214 can be attached to the second end portion 204, and/or the first and second end portions can be attached to intermediate portions (not shown) positioned between the various rails and the first end portion 200 and/or the second end portion 204. Furthermore, the first outer rail 212 and the second outer rail 214 can be aligned with a mid-longitudinal axis L4 of the second platform portion 14, with the first outer rail 212 being positioned on one side of the mid-longitudinal axis L4, and the second outer rail 214 being positioned on the other side of the mid-longitudinal axis L4.

In addition to providing structural rigidity to the second platform portion 14, the first outer rail 212 and the second outer rail 214 can also be used to support the second patient support portion 210 that can include a first upper thigh support 220, a second upper thigh support 222, a first lower thigh support 224, and a second lower thigh support 226. The first upper thigh support 220, the second upper thigh support 222, the first lower thigh support 224, and the second lower thigh support 226 can be moveably adjusted or fixed in position along portions of the first outer rail 212 and the second outer rail 214 to accommodate differently-sized patients. As depicted in FIGS. 1A and 1C, the first upper thigh support 220 and the first lower thigh support 224 are supported by the first outer rail 212, and the second upper thigh support 222 and the second lower thigh support 226 are supported by the second outer rail 214. As such, the first outer rail 212 and the second outer rail 214 serve as tracks affording movement of the first upper thigh support 220, the second upper thigh support 222, the first lower thigh support 224, and the second upper lower support 226. In addition to the first upper thigh support 220, the second upper thigh support 222, the first lower thigh support 224, and/or the second lower thigh support 226, a lower leg support 228 of the second patient support portion 210 can be provided. As depicted in FIGS. 1B and 6-12, the patient P is supported in a prone position by the first upper thigh support 220, the second upper thigh support 222, the first lower thigh support 224, the second lower thigh support 226, and the lower leg support 228. The first upper thigh support 220, the second upper thigh support 222, the first lower thigh support 224, the second upper thigh support 226, and the lower leg support 228 can be configured and operate similar fashion to those disclosed in U.S. Ser. Nos. 17/740,559 and 17/740,588, both filed May 10, 2022, which are incorporated by reference herein.

As depicted in FIGS. 1B and 6-12, adjustment of the relative positions of the first platform portion 12 and the second platform portion 14 affords positioning/orienting and repositioning/reorienting of the patient P supported thereby before, during, and after surgery. To illustrate, the first platform portion 12 and the second platform portion 14 can be independently adjusted relative to another to position/orient and reposition/reorient portions of the patient supported thereby. The independent adjustment of the relative positions of the first platform portion 12 and the second platform portion 14 is afforded by the separation therebetween defined by the gap G, and such adjustment can correspondingly be used to change the position/orientation of a first portion of the patient P supported by the first platform portion 12 and a second portion of the patient P supported by the second platform portion 14 relative to one another.

As depicted in FIGS. 1B and 6-12, for example, the head and upper torso of the patient P are supported by the first platform portion 12 and the upper and lower legs of the patient P are supported by the second platform portion 14. And, while the head and upper torso of the patient P are supported by the first patient support portion 180 on the first platform portion 12, and the upper and lower legs of the patient P are supported by the second patient support portion 210 on the second platform portion 14, the position of the patient P could be reversed with the first patient support portion 180 supporting the head and upper torso of the patient P on the second platform portion 14, and the second patient support portion 210 supporting the upper and lower legs of the patient P on the first platform portion 12. Furthermore, while the patient is supported in the prone position in FIGS. 1B and 6-12 the patient P could be supported in the supine position on the first platform portion 12 and the second platform portion 12.

The first platform portion 12 can be raised and lowered via operation of the corresponding telescoping column 140, can be rotated with rotation of the corresponding axle 158 via actuation of the corresponding motor and transmission 156 of the corresponding rotational portion 154, can be titled with rotation of the corresponding axle 164 via actuation of the corresponding motor and transmission 162 of the corresponding tilt portion 160, can be moved in side-to-side directions relative to the mid-longitudinal axes L1 and L2 via actuation of the actuator 80 of the slider portion 40, and can be rotated about a vertically-oriented axis relative to the support portion 16 via actuation of the actuator 94 of the rotator portion 42. Furthermore, the second platform portion 14 can be raised and lowered via operation of the corresponding telescoping column 140, can be rotated with rotation of the corresponding axle 158 via actuation of the corresponding motor and transmission 156 of the corresponding rotational portion 154, can be titled with rotation of the corresponding axle 164 via actuation of the corresponding motor and transmission 162 of the corresponding tilt portion 160, and can be moved toward and away from the first platform portion 12 in directions aligned with the mid-longitudinal axes L1 and L2 via actuation of the actuator 132 of the slider portion 100. In addition to such movement, the chest support portion 130, the head support portion 132, the first the first upper thigh support 220, the second upper thigh support 222, the first lower thigh support 224, the second lower thigh support 226, and the lower leg support 228 can be adjusted to accommodate differently-sized patients.

In manipulating the patient P, the telescoping column 140 of the first vertically-oriented portion 22 could be actuated to raise the position of the first platform portion 12 and the tilt portion 160 of the first vertically-oriented portion 22 could be actuated to tilt the position/orientation of the first platform portion 12, and in doing so, bend the patient's body from a neutral position/orientation (FIG. 6) to tilt the head and upper torso upwardly. Similarly, the telescoping platform 140 of the second vertically-oriented portion 22 could be actuated to raise the position of the second platform portion 14 and the tilt portion 160 of the second vertically-oriented portion could be actuated to tilt the position/orientation of the second platform portion 14, and in doing so, bend the patient's body to tilt the legs upwardly. Furthermore, as depicted in FIG. 7, the first support platform 12 and the second support platform 14 could be positioned/oriented to both tilt the head and upper torso of the patient P upwardly and tilt the legs of the patient P upwardly. Accordingly, the positions/orientations of the first support platform 12 and the second support platform 14 via actuation of the telescoping columns 140 and the tilt portions 160 of the first vertically-oriented portion 22 and the second vertically-oriented portion 24 can be adjusted from a neutral position/orientation as depicted in FIG. 6, to bend the patient's body to move the head and upper torso upwardly and/or move the legs upwardly to introduce degrees of extension to the patient's spine.

Figure 6:
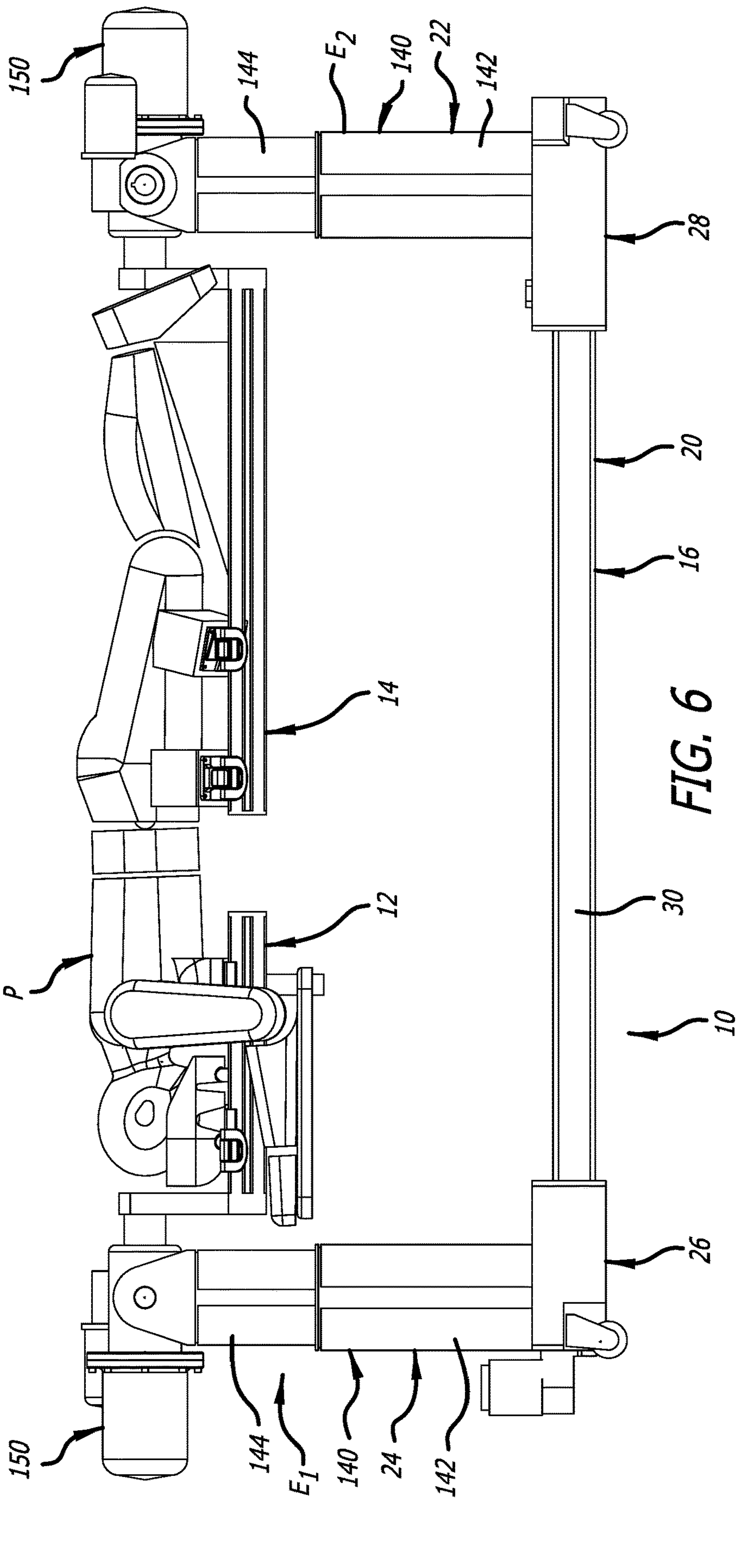
FIG. 6 is a side, elevational view that illustrates the patient positioned on the surgical table of FIG. 1A in the prone position with a first portion of the patient supported by a first platform portion and a second portion of the patient supported by a second platform portion in a neutral position.
Figure 7:
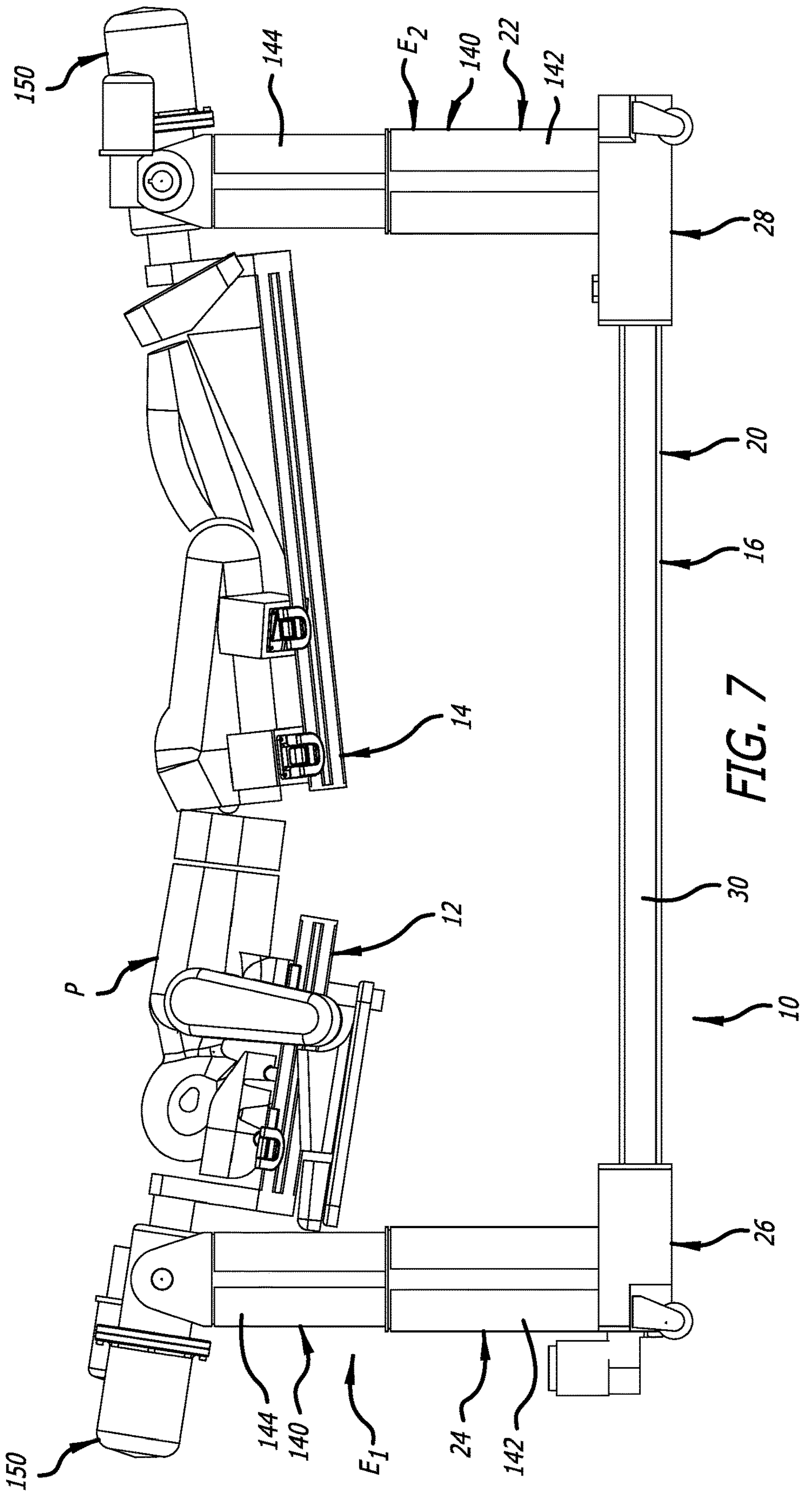
FIG. 7 is a side, elevational view that illustrates the first and second portions of the surgical table of FIG. 1A and the corresponding first and second portions of the patient supported thereon raised and tilted downwardly relative to another.
Figure 8:
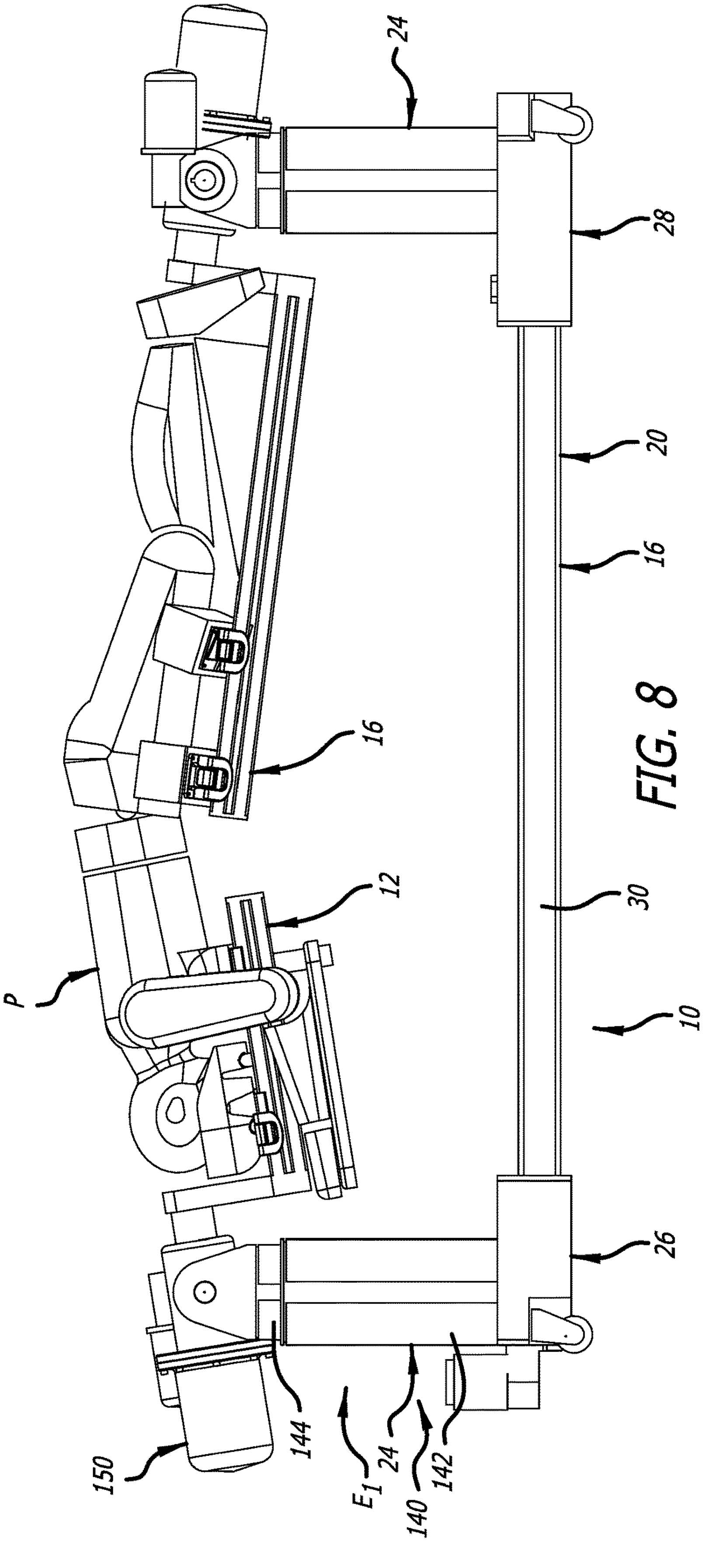
FIG. 8 is a side, elevational view that illustrates the first and second portions of the surgical table of FIG. 1A and the corresponding first and second portions of the patient supported thereon lowered and tilted upwardly relative to another.

Furthermore, the positions/orientations of the first support platform 12 and the second support platform 12, via actuation of the telescoping column 140 and the tilt portions 160 of the first vertically-oriented portion 22 and the second vertically-oriented portion 24, can be adjusted to bend the patient's body from the neutral position/orientation as depicted in FIG. 6, to move the head and upper torso downwardly and/or move the legs downwardly to introduce degrees of flexion to the patent's spine as depicted in FIG. 8.

In addition to the extension and the flexion of the patient's spine discussed above, the first portion of the patient's body supported by the first platform portion 12 and the second portion of the patient's body supported by the second platform portion 16 can be twisted relative to one another to introduce torsion therebetween via actuation of the rotational portions 154 of the first vertically-oriented portion 22 and the second vertically-oriented portion 24. Furthermore, the telescoping columns 140 of the first vertically-oriented portion 22 and the second vertically-oriented portion 24 can also be actuated (without tilting or twisting) to raise the first portion of patient's body supported by the first platform portion 12 relative to the second portion of the patient's body supported by the second platform portion 16, or vice versa. And, the sagittal position of the first portion relative to the second portion of the patient's body can be adjusted by operation of the slider portion 40 and the rotatable portion 42, and the patient's body can be stretched or contracted by operation of the slider portion 100.

Figure 9:
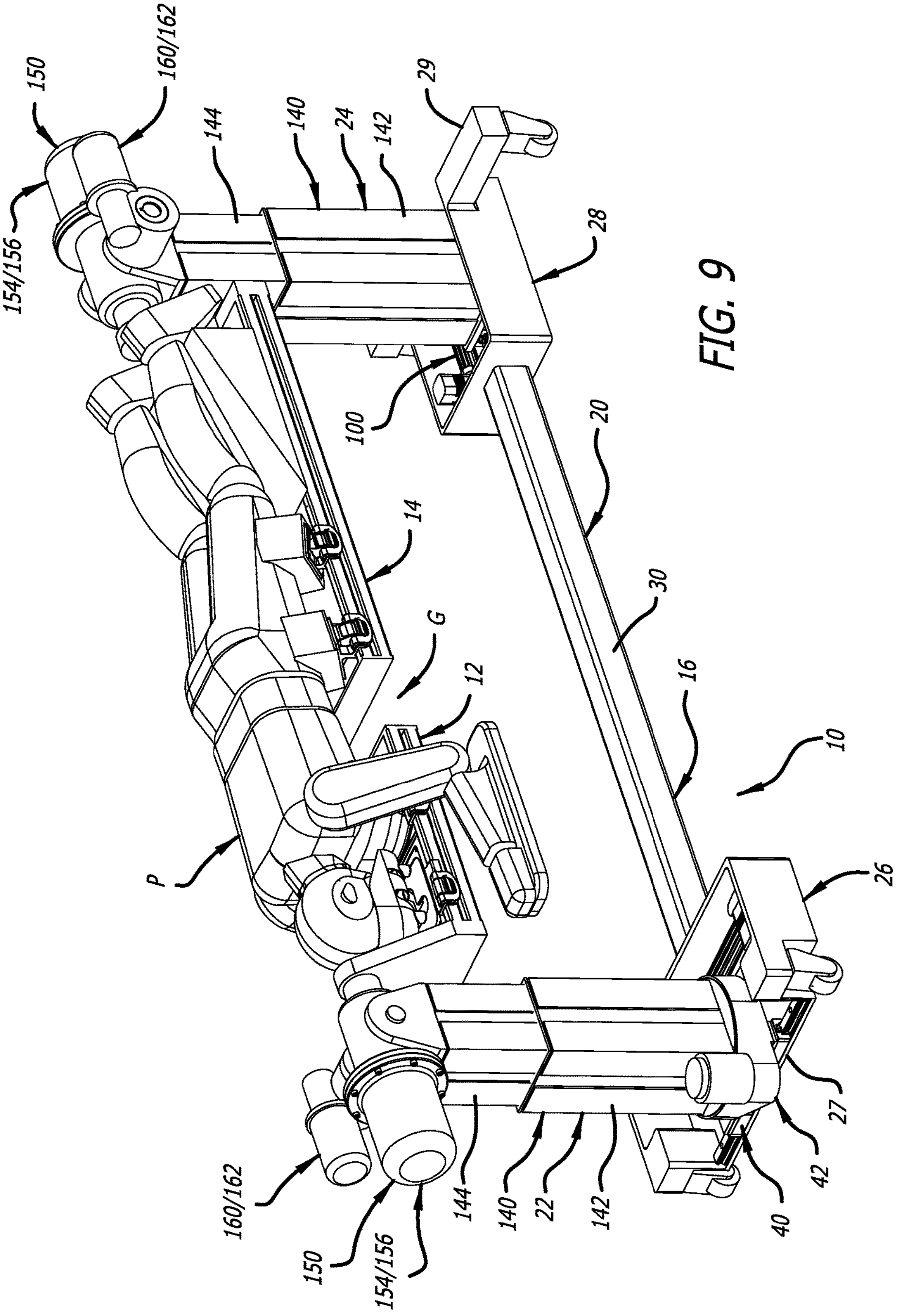
FIG. 9 is a side, perspective view that illustrates the patient positioned on the surgical table of FIG. 1A with the first portion of the patient positioned on the first platform portion and the second portion of the patient positioned on the second platform portion in a neutral position.
Figure 10:
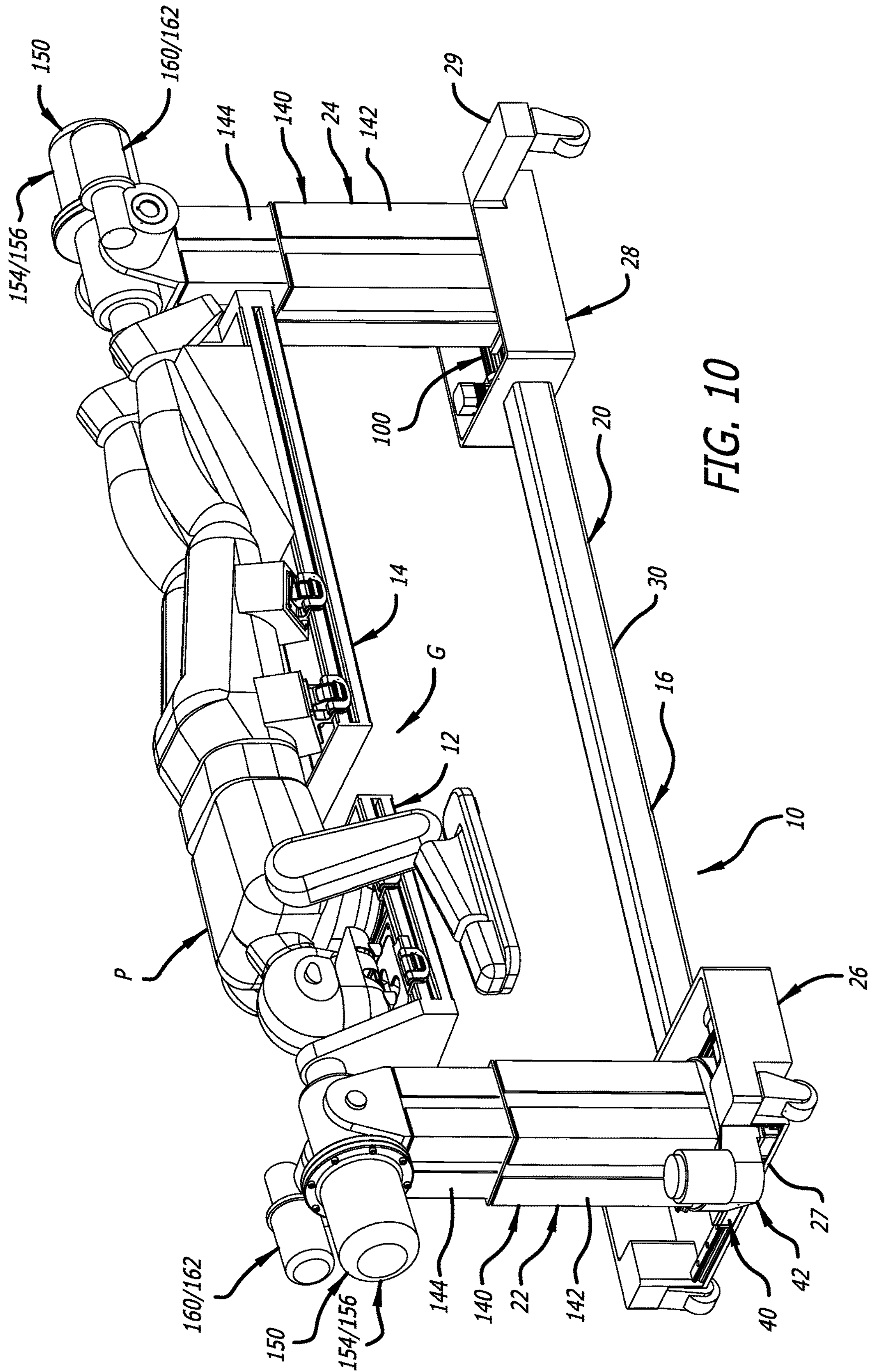
FIG. 10 is a side, perspective view similar to FIG. 9 showing sagittal adjustment of the position/orientation of the patient via movement of the first platform portion relative to the second platform portion.
Figure 11:
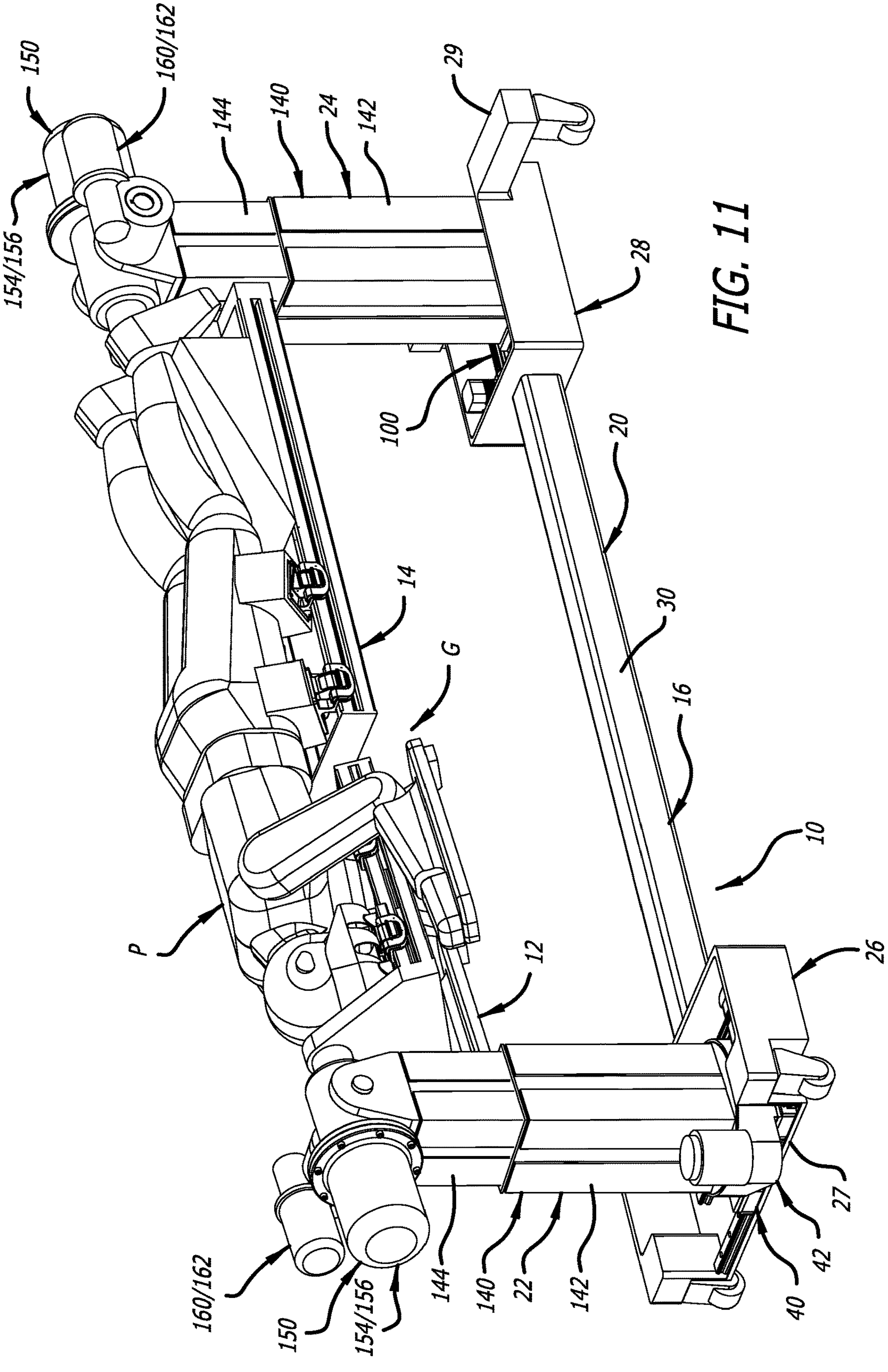
FIG. 11 is a side, perspective view similar to FIGS. 9 and 10 showing torsional adjustment in addition to the sagittal adjustment of the position/orientation of the patient via movement of the first platform portion and the second platform portion relative to one another.
Figure 12:
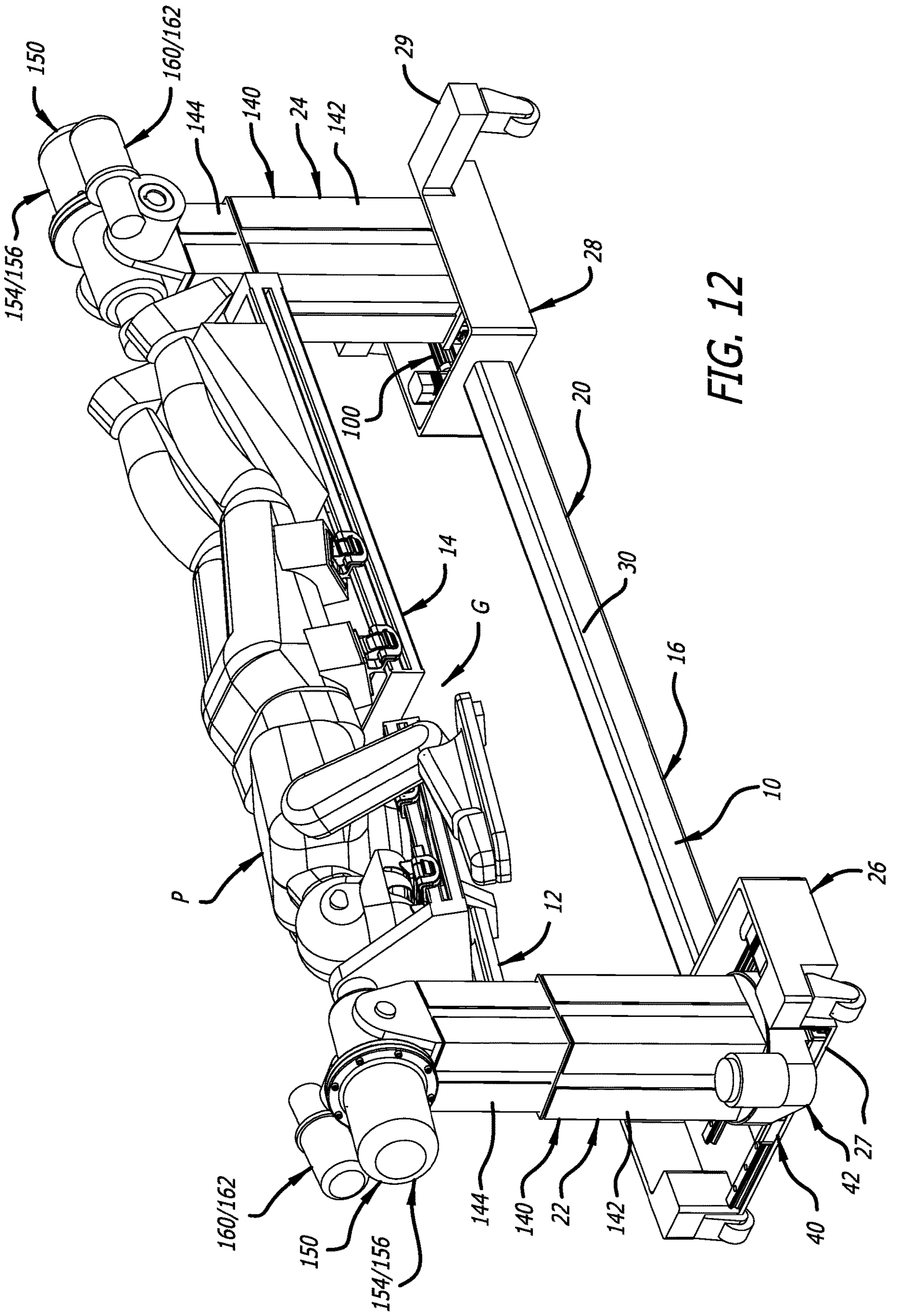
FIG. 12 is a side, perspective view similar to FIGS. 9-11 showing extensional adjustment in addition to the sagittal and torsional adjustment of the position/orientation of the patient via movement of the first platform portion and the second platform portion relative to one another.

As depicted in FIG. 9, the patient P is positioned/oriented in neutral position/orientation, and thereafter in FIGS. 10-12, independent adjustment of the first platform portion 12 and the second platform portion 14 relative to one another is used to adjust the position/orientation of the first portion of the patient's body supported by the first platform portion 12 and the second portion of the patient's body supported by the second platform portion 14 relative to one another. As depicted in FIG. 10, the slider portion 40 can be actuated to move the first platform portion 12 in a direction transverse to the mid-longitudinal axis L2, and the rotator portion 42 can be actuated to rotate the first platform portion 12 about a vertically-oriented axis. In doing so, the sagittal position/orientation of the patient P can be adjusted, as depicted in FIG. 10, via relative adjustment of the first platform portion 12 with respect to the second platform portion 14 using the slider portion 40 and the rotator portion 42. Then, as depicted in FIG. 11, the first platform portion 12 can be rotated via actuation of the rotational portion 154 and the second platform portion 14 can be moved closer to the first platform portion 12 via actuation of the slider 100 to adjust the torsional position/orientation (in addition to the adjusted sagittal position) of the first portion and the second portion of the patient P relative to one another. And, as depicted in FIG. 12, the first platform portion 12 can be raised and tilted via respective actuation of the telescoping column 140 and the tilt portion 160 of the first vertically-oriented portion 22, and the second platform portion 14 can be lowered via actuation of the telescoping column 140 of the second vertically-oriented portion 24 to adjust the extensional position/orientation (in addition to the adjusted sagittal and torsional position/orientation) of the first portion and the second portion of the patient P relative to one another.

Accordingly, the actuation of the telescoping columns 140, the rotational portions 154, tilt portions 160, the slider portions 40, the rotational portions 42, and/or the slider portion 100 can be used to independently adjust the relative positions and orientations of the first platform portion 12 and the second platform portion 16. And the relative movement of the first platform portion 12 and the second platform portion 16 can be used to adjust the position/orientation of the patient's body P before, during, and after surgery. As discussed above, the surgical table 10 can include a controller or controllers for controlling actuatable portions thereof to facilitate the operation thereof to coordinate movement therebetween. And such coordinated movement via the controller or controllers, for example, can be used to manipulate and prevent over-extension or over-flexion of the spine of the patient before, during, and after surgery. Thereafter, when the surgery is complete, the patient can be removed from the first platform portion 12 and the second platform portion 14.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

We claim:

1. A surgical table comprising:

a support portion including a first end, an opposite second end, a mid-longitudinal axis extending through the first end and the second end, a first end portion at and adjacent the first end, a second end portion at and adjacent the second end, and a cross member extending between the first end portion and the second end portion of the support portion, the first end portion of the support portion including a first slider portion and a rotator portion supported by the first slider portion, and the second end portion of the support portion including a second slider portion;

a first platform portion, and a first vertically-oriented portion supporting the first platform portion relative to the rotator portion of the first end portion of the support portion, the first platform portion including a first end, an opposite second end, a first end portion at the first end of the first platform portion, a second end portion at the second end of the first platform portion, at least a first rail and a second rail extending between the first end portion and the second end portion of the first platform portion, and a head support and a chest support supported by the at least the first rail and the second rail of the first platform portion, and the first vertically-oriented portion vertically spacing the first platform portion apart from the support portion; and a second platform portion, and a second vertically-oriented portion supporting the second platform portion relative to the second slider portion of the second end portion of the support portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, and the second vertically-oriented portion vertically spacing the second platform portion apart from the support portion;

wherein the first platform portion and the second platform portion are positioned adjacent to one another and separated by a gap between the first end of the first platform portion and the second end of the second platform portion;

wherein the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

2. The surgical table of claim 1, wherein each of the first vertically-oriented portion and the second vertically-oriented portions includes a telescoping column that is expandable and contractible between a first height and a second height to correspondingly move the first platform portion and the second platform portion upwardly and downwardly relative to the support portion.

3. The surgical table of claim 1, wherein at least one of the head support, the chest support, the first thigh support, and the second thigh support are each adjustable relative to the at least the first rails and the second rails of a respective one of the first platform portion and the second platform portion to accommodate patients of different sizes.

4. The surgical table of claim 1, further comprising a first adjustment portion positioned between the first support platform and the first vertically-oriented portion that is configured to tilt the first end of the first platform portion upwardly and downwardly relative to the support portion, and configured to rotate the first platform portion side-to-side relative to the support portion.

5. The surgical table of claim 4, further comprising a second adjustment portion positioned between the second support platform and the second vertically-oriented portion that is configured to tilt the second end of the second platform portion upwardly and downwardly relative to the support portion, and configured to rotate the second platform portion side-to-side relative to the support portion.

6. The surgical table of claim 5, wherein each of the first vertically-oriented portion and the second vertically-oriented portions includes a telescoping column that is expandable and contractible between a first height and a second height to correspondingly move the first platform portion and the second platform portion upwardly and downwardly relative to the support portion.

7. The surgical table of claim 5, wherein, when a first portion of a patient is supported by the first platform portion and a second portion of the patient is supported by the second platform portion in a prone position, downward tilting of at least one of the first support platform and the second support platform via operation of a corresponding one of the first adjustment portion and the second adjustment portion can adjust extensional positions/orientations of the patient, and upward tilting of at least one of the first support platform and the second support platform via operation of a corresponding one of the first adjustment portion and the second adjustment portion can adjust flexional positions/orientations of the patient.

8. The surgical table of claim 7, wherein, when the first portion of the patient is supported by the first platform portion and the second portion of the patient is supported by the second platform portion, rotation of at least one of the first platform portion and the second platform portion via operation of a corresponding one of the first adjustment portion and the second adjustment portion can adjust torsional positions/orientations of the patient.

9. The surgical table of claim 1, wherein, when a first portion of a patient is supported by the first platform portion and a second portion of the patient is supported by the second platform portion, the operation of the first slider portion and the rotator portion can adjust the sagittal position/orientation of the patient.

10. A surgical table comprising:

a support portion including a first end, an opposite second end, a mid-longitudinal axis extending through the first end and the second end, a first end portion at and adjacent the first end, a second end portion at and adjacent the second end, and a cross member extending between the first end portion and the second end portion of the support portion, the first end portion of the support portion including a first slider portion and a rotator portion supported by the first slider portion, and the second end portion of the support portion including a second slider portion;

a first platform portion, and a first vertically-oriented portion supporting the first platform portion relative to the rotator portion of the first end portion of the support portion, the first platform portion including a first end, an opposite second end, a first end portion at the first end of the first platform portion, a second end portion at the second end of the first platform portion, at least a first rail and a second rail extending between the first end portion and the second end portion of the first platform portion, and a head support and a chest support supported by the at least the first rail and the second rail of the first platform portion, the first vertically-oriented portion being expandable and contractable, and vertically spacing the first platform portion apart from the support portion; and a second platform portion, and a second vertically-oriented portion supporting the second platform portion relative to the second slider portion of the second end portion of the support portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, the second vertically-oriented portion being expandable and contractable, and vertically spacing the second platform portion apart from the support portion;

wherein the first platform portion and the second platform portion are positioned adjacent to one another and separated by a gap between the first end of the first platform portion and the second end of the second platform portion;

wherein a first adjustment portion is positioned one of between the first platform portion and the first vertically-oriented portion and between the second platform portion and the second vertically-oriented portion, the first adjustment portion being configured to tilt a first corresponding one of the first platform portion and the second platform portion upwardly and downwardly relative to the support portion, and to rotate the first corresponding one of the first platform portion and the second platform portion side-to-side relative to the support portion;

wherein the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

11. The surgical table of claim 10, wherein at least one of the head support, the chest support, the first thigh support, and the second thigh support are each adjustable relative to the at least the first rails and the second rails of a respective one of the first platform portion and the second platform portion to accommodate patients of different sizes.

12. The surgical table of claim 10, further comprising a second adjustment portion positioned the other of between the first support platform and the first vertically-oriented portion and between the second support platform and the second vertically-oriented portion, the second adjustment portion being configured to tilt a second corresponding one of the first platform portion and the second platform portion upwardly and downwardly relative to the support portion, and to rotate the second corresponding one of the first platform portion and the second platform portion side-to-side relative to the support portion.

13. The surgical table of claim 12, wherein, when a first portion of a patient is supported by the first platform portion and a second portion of the patient is supported by the second platform portion in a prone position, downward tilting of at least one of the first support platform and the second support platform can adjust extensional positions/orientations of the patient, and upward tilting of at least one of the first support platform and the second support platform can adjust flexional positions/orientations of the patient.

14. The surgical table of claim 12, wherein, when the first portion of the patient is supported by the first platform portion and the second portion of the patient is supported by the second platform portion, rotation of at least one of the first platform portion and the second platform portion can adjust torsional positions/orientations of the patient.

15. The surgical table of claim 10, wherein, when a first portion of a patient is supported by the first platform portion and a second portion of the patient is supported by the second platform portion, the operation of the first slider portion and the rotator portion can adjust the sagittal position/orientation of the patient.

16. A surgical table comprising:

a support portion including a first end, an opposite second end, a mid-longitudinal axis extending through the first end and the second end, a first end portion at and adjacent the first end, a second end portion at and adjacent the second end, and a cross member extending between the first end portion and the second end portion of the support portion, the first end portion of the suport portion including a first slider portion and a rotator portion supported by the first slider portion, and the second end portion of the support portion including a second slider portion;

a first platform portion, and a first vertically-oriented portion supporting the first platform portion relative to the rotator portion of the first end portion of the support portion, and a first adjustment portion positioned between the first platform portion and the first vertically-oriented portion, the first platform portion including a first end, an opposite second end, a first end portion at the first end of the first platform portion, a second end portion at the second end of the first platform portion, at least a first rail and a second rail extending between the first end portion and the second end portion of the first platform portion, and a head support and a chest support supported by the at least the first rail and the second rail of the first platform portion, the first vertically-oriented portion being expandable and contractable, and vertically spacing the first platform portion apart from the support portion, and the first adjustment portion being configured to tilt the first end of the first platform portion upwardly and downwardly relative to the support portion, and to rotate the first platform portion side-to-side relative to the support portion; and a second platform portion, a second vertically-oriented portion supporting the second platform portion relative to the second slider portion of the second end portion of the support portion, and a second adjustment portion positioned between the second platform portion and the second vertically-oriented portion, the second platform portion including a first end, an opposite second end, a first end portion at the first end of the first platform portion, a second end portion at the second end of the first platform portion, at least a first rail and a second rail extending between the first end portion and the second end portion of the second platform portion, and at least a first thigh support and a second thigh support supported by the at least the first rail and the second rail of the second platform portion, the second vertically-oriented portion vertically spacing the second platform portion apart from the support portion, and the second adjustment portion being configured to tilt the second end of the second platform portion upwardly and downwardly relative to the support portion, and to rotate the second platform portion side-to-side relative to the support portion;

wherein the first platform portion and the second platform portion are positioned adjacent to one another and separated by a gap between the first end of the first platform portion and the second end of the second platform portion;

wherein the first platform portion is moveable side-to-side across the mid-longitudinal axis via operation of the slider portion, the first platform portion is rotatable about an axis transverse to the mid-longitudinal axis via operation of the rotator portion, and the second platform portion is moveable toward and away from the first platform portion in directions aligned with the mid-longitudinal axis via operation of the slider portion.

17. The surgical table of claim 16, wherein at least one of the head support, the chest support, the first thigh support, and the second thigh support are each adjustable relative to the at least the first rails and the second rails of a respective one of the first platform portion and the second platform portion to accommodate patients of different sizes.

18. The surgical table of claim 16, wherein, when a first portion of a patient is supported by the first platform portion and a second portion of the patient is supported by the second platform portion in a prone position, downward tilting of at least one of the first support platform and the second support platform via operation of a corresponding one of the first adjustment portion and the second adjustment portion can adjust extensional positions/orientations of the patient, and upward tilting of at least one of the first support platform and the second support platform via operation of a corresponding one of the first adjustment portion and the second adjustment portion can adjust flexional positions/orientations of the patient.

19. The surgical table of claim 16, wherein, when the first portion of the patient is supported by the first platform portion and the second portion of the patient is supported by the second platform portion, rotation of at least one of the first platform portion and the second platform portion via operation of a corresponding one of the first adjustment portion and the second adjustment portion can adjust torsional positions/orientations of the patient.

20. The surgical table of claim 16, wherein, when a first portion of a patient is supported by the first platform portion and a second portion of the patient is supported by the second platform portion, the operation of the first slider portion and the rotator portion can adjust the sagittal position/orientation of the patient.

* * * * *